(12) United States Patent
Skotheim et al.

(10) Patent No.: US 6,482,545 B1
(45) Date of Patent: Nov. 19, 2002

(54) MULTIFUNCTIONAL REACTIVE MONOMERS FOR SAFETY PROTECTION OF NONAQUEOUS ELECTROCHEMICAL CELLS

(75) Inventors: Terje A. Skotheim, Tucson, AZ (US); Alexander A. Gorkovenko, Tucson, AZ (US); Alexei B. Gavrilov, Tucson, AZ (US); Igor P. Kovalev, Tucson, AZ (US)

(73) Assignee: Moltech Corporation, Tucson, AZ (US)

( * ) Notice: Subject to any disclaimer, the term of this patent is extended or adjusted under 35 U.S.C. 154(b) by 0 days.

(21) Appl. No.: 09/474,471

(22) Filed: Dec. 29, 1999

Related U.S. Application Data

(63) Continuation of application No. 09/093,528, filed on Jun. 8, 1998, now abandoned.

(51) Int. Cl.$^7$ ................................................ H01M 4/62
(52) U.S. Cl. ...................................................... 429/217
(58) Field of Search ........................................ 429/217

(56) References Cited

U.S. PATENT DOCUMENTS

| | | |
|---|---|---|
| 3,639,174 A | 2/1972 | Kegelman |
| 4,075,400 A | 2/1978 | Fritts |

(List continued on next page.)

FOREIGN PATENT DOCUMENTS

| | | |
|---|---|---|
| EP | 0 631 339 A2 A3 | 12/1994 |
| EP | 0 634 802 A1 | 1/1995 |
| EP | 0 759 641 A1 | 2/1997 |
| JP | 02-300211 A | * 12/1990 |
| JP | 09-045369 A | 2/1997 |
| JP | 10-270084 | 10/1998 |
| JP | 11-097059 A | 4/1999 |

OTHER PUBLICATIONS

Chemical Abstracts, Columbus, OH, U.S., Abstract No. 129:278437, "Secondary nonaqueous electrolyte batteries" corresponding to JP 10–270,084 A2. (1998).

Chemical Abstracts, Columbus, Ohio, US; Abstract No. 126:227649, "Secondary nonaqueous electrolyte batteries" XP002115726, corresponding to JP 09–045369 A.

(List continued on next page.)

*Primary Examiner*—Yogendra N. Gupta
*Assistant Examiner*—John M Petruncio
(74) *Attorney, Agent, or Firm*—Jacqueline M. Nicol; Steven A. Carlson

(57) ABSTRACT

The present invention pertains to non-aqueous electrolytes which comprise (a) one or more solvents; (b) one or more ionic salts; and, (c) a multifunctional monomer comprising two or more unsaturated aliphatic reactive moieties per molecule, which multifuntional monomer is soluble in said one or more solvents, which multifuctional monomer rapidly polymerizes when said electrolyte is heated to an initiation temperature greater than 100° C., thereby increasing said viscosity and internal resistivity of said electrolyte. When incorporated into a nonaqueous electrolyte, the multifunctional reactive monomer improves the safety of electric current producing cells by rapidly polymerizing at elevated temperatures to increase the viscosity and internal resistivity of the electrolyte. The present invention also pertains to electric current producing cells comprising such non-aqueous electrolytes, methods of making such non-aqueous electrolytes and electric current producing cells, and methods for increasing the safety of an electric current producing cell.

53 Claims, 3 Drawing Sheets

U.S. PATENT DOCUMENTS

| | | | |
|---|---|---|---|
| 4,650,730 A | 3/1987 | Lundquist et al. | |
| 4,753,859 A | 6/1988 | Brand et al. | |
| 4,833,048 A | 5/1989 | De Jonghe et al. | |
| 4,846,185 A | 7/1989 | Carim | |
| 4,917,974 A | 4/1990 | De Jonghe et al. | |
| 4,952,330 A | 8/1990 | Leger et al. | |
| 4,971,867 A | 11/1990 | Watanabe et al. | |
| 4,973,532 A | 11/1990 | Taskier et al. | |
| 5,008,161 A | 4/1991 | Johnston | |
| 5,162,175 A | 11/1992 | Visco et al. | |
| 5,194,341 A | 3/1993 | Bagley et al. | |
| 5,219,684 A | 6/1993 | Wilkinson et al. | |
| 5,225,473 A | 7/1993 | Duan | |
| 5,324,599 A | 6/1994 | Oyama et al. | |
| 5,411,819 A * | 5/1995 | Marchese et al. | 429/192 |
| 5,506,068 A | 4/1996 | Dan et al. | |
| 5,516,598 A | 5/1996 | Visco et al. | |
| 5,523,179 A | 6/1996 | Chu | |
| 5,529,860 A | 6/1996 | Skotheim et al. | |
| 5,532,077 A | 7/1996 | Chu | |
| 5,534,365 A | 7/1996 | Gee et al. | |
| 5,538,812 A | 7/1996 | Lee et al. | |
| 5,580,680 A | 12/1996 | Chaloner-Gill et al. | |
| 5,582,623 A | 12/1996 | Chu | |
| 5,601,947 A | 2/1997 | Skotheim et al. | |
| 5,686,201 A | 11/1997 | Chu | |
| 5,690,702 A | 11/1997 | Skotheim et al. | |
| 5,714,277 A | 2/1998 | Kawakami | |

OTHER PUBLICATIONS

Chemical Abstracts, Columbus, Ohio, US; Abstract No. 130:239929, "Secondary nonaqueous electrolyte batteries" XP002115725, corresponding to JP 11–097059 A.

Chemical Abstracts, vol. 121, No. 16, Columbus, Ohio, US; Abstract No. 183583, "Secondary nonaqueous batteries with improved electrolyte solutions" XP002115723, corresponding to JP 06–163078 A (Oct. 17, 1994).

Laman, F.C., et al., "Impedance Studies for Separators in Rechargeable Lithium Batteries", *J. Electrochem. Soc.*, vol. 140, No. 4, pp. L51–L53 (Apr. 1993).

Patent Abstracts of Japan, vol. 015, No. 076, corresponding to JP 02–300211 A (Feb. 21, 1991).

Patent Abstracts of Japan, vol. 095, No. 001, corresponding to JP 06–290793 A (Feb. 28, 1995).

Patent Abstracts of Japan, vol. 18, No. 475, corresponding to JP 06–163078 (Sep. 5, 1994).

* cited by examiner

MULTIFUNCTIONAL REACTIVE MONOMERS FOR SAFETY PROTECTION OF NONAQUEOUS ELECTROCHEMICAL CELLS

This is a continuation of application Ser. No. 09/093,528 filed Jun. 8, 1998 abandoned.

TECHNICAL FIELD

The present invention relates generally to the field of nonaqueous electrolytes and electric current producing cells. More particularly, this invention pertains to non-aqueous electrolytes which comprise (a) one or more solvents; (b) one or more ionic salts; and, (c) a multifunctional monomer. When incorporated into a nonaqueous electrolyte, the multifunctional reactive monomer improves the safety of electric current producing cells by rapidly polymerizing at elevated temperatures to increase the viscosity and internal resistivity of the electrolyte. The present invention also pertains to electric current producing cells comprising such non-aqueous electrolytes, methods of making such non-aqueous electrolytes and electric current producing cells, and methods for increasing the safety of an electric current producing cell.

BACKGROUND

Throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

Electric current producing cells, and batteries containing such cells, consist of pairs of electrodes of opposite polarity separated by an electrolyte. The charge flow between electrodes is maintained by an ionically conducting electrolyte.

Successful use of batteries depends on their safety during operation under normal conditions and even under abusive usage. An abusive use such as short circuiting or rapid overcharging of the battery may initiate self-heating of the battery, as opposed to merely resistive heating, leading to thermal runaway. Self-heating of the battery is especially problematic when a lithium anode is utilized. Lithium batteries are capable of much higher power storage densities than batteries not based on lithium, but the reactivity of lithium to most materials and its melting point of only about 180° C. promote self-heating and the potential for thermal runaway. This reactivity of lithium to the electrolyte and other materials of the battery is typically increased in secondary or rechargeable lithium cells upon the cycling of the lithium. The main processes causing self-heating of a secondary lithium cell typically involve the chemical reaction between cycled lithium and electrolyte solvent. These self-heating reactions are believed to be initiated at temperatures near 100° C. At temperatures greater than 100° C., additional contributions to cell self-heating are believed to come from exothermic decomposition of the electrolyte as well as from reactions between lithium and the ionic salt in the electrolyte.

One approach to reduce the potential of unsafe explosive conditions with lithium batteries has been to use blends of electrolyte solvents which have a lower reactivity with lithium. For example, U.S. Pat. No. 4,753,859 to Brand et al. describes the use of one or more polyethylene glycol diallyl ethers with ethylene carbonate and propylene carbonate as the electrolyte solvents to improve the safety characteristics of a nonaqueous lithium cell. Also, for example, U.S. Pat. No. 5,219,684 to Wilkinson et al. describes the use of sulfolane and a glyme as the electrolyte solvents for improved safety in electrochemical cells with a lithium-containing anode and a cathode with a lithiated manganese dioxide as the active material. Although it is beneficial to safety to select the electrolyte solvent composition to reduce the reactivity with the lithium, solvent choice alone does not provide strong protection against overheating and thermal runaway. Among the disadvantages of this approach of using less reactive electrolyte solvents are that the battery is not shutdown or reduced in current flow at high temperatures, but is still capable of high energy electrochemical reactions leading to more heat buildup and degradation reactions which may eventually result in an explosive condition. Also, the electrolyte solvent composition may not be compatible with the specific cathode composition used in the cell. During the discharging and charging of electrochemical cells, many electrochemically reduced and oxidized compounds are formed which may not be stable or otherwise compatible with the electrolyte solvents. For example, solid sulfur-based cathodes are very desirable for use with lithium-containing anodes because of the extremely high power density of this combination of electroactive materials, but the organic and inorganic polysulfides typically formed in the discharge or reduction cycle of these nonaqueous lithium-sulfur type batteries may not be compatible with one or more solvents, such as ethylene carbonate, in the electrolyte solvent blend selected for safety.

Another approach to improve the safety of electrochemical cells has been to incorporate a PTC (positive temperature coefficient) device that has increased electrical resistance at high temperatures and thereby suppresses the flow of current through the cell as, for example, described in U.S. Pat. No. 4,971,867 to Watanabe et al. and U.S. Pat. No. 5,008,161 to Johnston. PTC devices may provide useful safety protection against internal short circuits and against overcharge and overdischarge conditions, but they are not adequate to substantially shutdown or reduce the activity of the reactive chemistry in a cell.

To control overheating under abusive usage, it has been suggested that a thermally activated separator be developed for insertion between the cathode and the anode. It has been further suggested that a microporous sheet might function as this thermally activated separator if it exhibited low resistivity at normal operating temperatures but irreversibly transformed into a product having high resistivity at high temperatures, while maintaining its dimensional integrity. For example, U.S. Pat. No. 4,650,730 to Lundquist et al. describes a multi-ply microporous sheet useful as a battery separator having at least two plies with different transformation temperatures for forming a substantially non-porous sheet at elevated temperatures. Microporous polymeric films presently employed as separators in lithium batteries are generally not capable of preventing uncontrolled heating. In general, polymeric separators degrade, to one extent or another, under the influence of heat and thermal reactions, or become dimensionally unstable, and they do not substantially reduce or shutdown the activity of the reactive chemistry of a cell.

It has been suggested by Laman et al., *J. Electrochem. Soc.*, 1993, 140, L51 to L53, that for a separator to function well as an internal safety device in a lithium battery, it should have the following characteristics: a melting point close to 100° C. for the low melting point component, a high dimensional stability temperature preferably above the melting point of lithium, and a high degree and rate of shutdown, giving rise to an impedance increase of at least three orders of magnitude with an increase of a few degrees Celsius in temperature. They note that it is difficult to achieve these properties in a single separator and that obtaining all these characteristics can be more easily achieved by combining different separators. Using a combination of different polymeric separators, especially when the surface area of separators required in the battery is very large, significantly increases the expense of producing the battery, as well as reducing the volume available for electroactive material, thereby reducing the specific capacity of the cell.

To overcome the safety disadvantages of conventional polymeric films as battery separators, one approach has been to add a thermal fuse material which melts at high temperatures to the polymeric film so that the thermal fuse material melts and irreversibly reduces the porosity of the microporous polymeric films, thereby interrupting the electrochemical reaction in the, battery. For example, U.S. Pat. No. 4,973,532 to Taskier et al. describes a battery separator with a thermal fuse material adhered to a porous substrate in a predetermined geometric array.

As an alternative to a melting transformation of the battery separator material to provide safety protection, a temperature-induced change in the electrolyte composition has been suggested. For example, U.S. Pat. No. 5,506,068 to Dan et al. describes a liquid electrolyte solution containing a solvent which rapidly polymerizes at a temperature exceeding 100° C. to cause an increase in the internal resistivity of the cell and to safely terminate the operation of the cell. They noted that this advantageous result had only been observed with 1,3-dioxolane as the solvent in the presence of a manganese dioxide based cathode and certain lithium based ionic salts and suggested that it was conceivable that other combinations of electrode, solvent, and salt may produce a similar result. U.S. Pat. No. 4,952,330 to Leger et al. describes an organic electrolyte containing 40 to 53 volume per cent of a polymerizable component of a cyclic ether, preferably 1,3-dioxolane is the cyclic ether, that will effectively prevent internal shorting of cells when subjected to certain kinds of abusive conditions.

Besides temperature-induced effects by the solvent of the electrolyte to provide safety protection, electrolytes containing additives which polymerize or melt to increase the internal resistance of the battery have been utilized for safety protection. For example, Eur. Pat. Application No. 759,641 to Mao describes the addition of a monomer additive, such as biphenyl or other aromatic additives, to the liquid electrolyte of a lithium anode based battery with a lithium insertion compound cathode to protect the battery during overcharge by polymerization of the additive at battery voltages greater than the maximum operating voltage. Also, for example, U.S. Pat. No. 5,534,365 to Gee et al. describes the use of dispersed particles of an inert fusible material in a solid polymer electrolyte to melt at temperatures in the range of 80° C. to 120° C. to provide safety by increasing the impedance of the solid electrolyte.

Another temperature-induced approach to safety protection in batteries is to release a poisoning agent, which deactivates the battery, when a certain temperature is reached. For example, U.S. Pat. No. 4,075,400 to Fritts describes an encapsulated battery poisoning agent where the encapsulant melts at a determined melting point to provide overheating and overload protection to the battery. U.S. Pat, No. 5,714,277 to Kawakami describes electrolyte solutions or separators comprising microcapsules that melt in the temperature range of 70–150° C. and contain a chemical substance which is discharged when the microcapsules melt. The chemical substance may be a polymerization initiator, a compound having a hydroxyl group, an acid, a cross-linking agent, or a flame retardant. The microcapsules may optionally contain monomer, oligomer, or polymer. U.S. Pat. No. 5,580,680 to Chaloner-Gill et al. describes a solid electrolyte that includes one or more catalysts that are capable of initiating the polymerization of the solvent component of the electrolyte at elevated temperatures. Microcapsules may be used that permit the controlled release of the catalysts into the electrolyte under the appropriate conditions.

It would be advantageous to the art of battery design, particularly for secondary lithium batteries, if the electrolyte would function as the electrolyte up to a specified initiation temperature, and thereafter, the electrolyte underwent a rapid and irreversible transformation, such as an increase in viscosity and internal resistivity, to reduce the ionic conductivity of the electrolyte, thereby providing increased safety to the battery, such as, for example, safely preventing overheating and thermal runaway, and for example, safely terminating the operation of the battery.

SUMMARY OF THE INVENTION

One aspect of the present invention pertains to a nonaqueous electrolyte for use in an electric current producing cell, the electrolyte having a viscosity and an internal resistivity, the electrolyte comprising (a) one or more solvents; (b) one or more ionic salts; and, (c) a multifunctional monomer comprising two or more unsaturated aliphatic reactive moieties per molecule, which multifunctional monomer is soluble in said one or more solvents, which multifunctional monomer rapidly polymerizes when said electrolyte is heated to an initiation temperature greater than 100° C., thereby increasing said viscosity and internal resistivity of said electrolyte. This polymerization increases the viscosity and internal resistivity of the electrolyte and increases the safety of the cell. In one embodiment, upon rapid polymerization of the electrolyte at the initiation temperature, the viscosity and internal resistivity of the electrolyte increase to a level sufficient to safely terminate current producing operation of the cell.

In one embodiment, the reactive moieties of the multifunctional monomer of the nonaqueous electrolyte of the present invention are selected from the group consisting of: vinyl ($CH_2$=CH—), allyl ($CH_2$=CH—$CH_2$—), vinyl ether ($CH_2$=CH—O—), allyl ether ($CH_2$=CH—$CH_2$—O—), allyl ester ($CH_2$=CH—$CH_2$—C(O)—O—), allyl amine ($CH_2$=CH—$CH_2$—NH—), acrylyl ($CH_2$=CH—C(O)—), acrylate ($CH_2$=CH—C(O)—O—), acrylainde ($CH_2$=CH—C(O)—NH—), methacrylyl ($CH_2$=C($CH_3$)—C(O)—), methacrylate ($CH_2$=C($CH_3$)—C(O)—O—), and crotoxyl ($CH_3$—CH=C($CH_3$)—C(O)—).

In one embodiment, the multifunctional monomer is a multifuictional vinyl ether monomer, preferably a vinyl ether monomer selected from the group consisting of; divinyl ether monomers, trivinyl ether monomers, and tetravinyl ether monomers. In a more preferred embodiment, the multifunctional monomers is a divinyl ether monomer. In a most preferred embodiment, the divinyl ether monomer is selected from the group consisting of: divinyl ether of ethylene glycol, divinyl ether of diethylene glycol, divinyl ether of triethylene glycol, divinyl ether of tetraethylene glycol, divinyl ether of 1,4-butanediol, and divinyl ether of 1,4-cyclohexanedimethanol.

In one embodiment, the nonaqueous electrolyte of the present invention is selected from the group consisting of:

liquid electrolytes, gel polymer electrolytes, and solid polymer electrolytes. In a preferred embodiment, the electrolyte is a liquid electrolyte.

In one embodiment, the one or more solvents of the nonaqueous electrolyte of this invention comprise a solvent selected from the group consisting of: N-methyl acetamide, acetonitrile, organic carbonates, sulfolanes, sulfones, N-alkyl pyrrolidones, dioxolanes, glymes, siloxanes and xylenes.

In one embodiment, the one or more ionic salts of the nonaqueous electrolyte of this invention comprise a lithium salt.

In one embodiment, the weight ratio of the combined total weight of multifunctional monomers present to the combined total weight of the one or more solvents in the nonaqueous electrolyte of this invention is in the range of 0.01:1 to 0.25:1. In a preferred embodiment, the weight ratio is in the range of 0.02:1 to 0.15:1 and, more preferably, the weight ratio is in the range of 0.02:1 to 0.1:1.

In one embodiment, the nonaqueous electrolyte of the present invention further comprises a monofunctional monomer having one unsaturated aliphatic reactive moiety per molecule, which monofunctional monomer is soluble in the one or more solvents of the electrolyte, which monofunctional monomer rapidly reacts with the multifunctional monomer when the electrolyte is heated to an initiation temperature greater than 100° C. In at preferred embodiment, the monofunctional monomer of the present invention is selected from the group consisting of: vinyl ethers and allyl ethers. In a more preferred embodiment, the monofunctional monomer is a vinyl ether selected from the group consisting of: vinyl ether of 1-butanol, vinyl ether of 2-ethylhexanol, and vinyl ether of cyclohexanol.

In one embodiment, the weight ratio of the combined total weight of the monofunctional monomers present to the combined total weight of the one or more solvents and the multifunctional monomers present is in the range of 0.005:1 to 0.2:1. In a preferred embodiment, the weight ratio is in the range of 0.01:1 to 0.1:1.

In one embodiment, the nonaqueous electrolyte of this invention further comprises a polymerization initiator to increase the rate of polymerization of the multifunctional monomer. In a preferred embodiment, the polymerization initiator comprises a cationic polymerization initiator. In a more preferred embodiment, the polymerization initiator comprises a lithium ion.

In one embodiment, the nonaqueous electrolyte of the present invention further comprises an polymerization inhibitor to decrease the rate of polymerization of the multifunctional monomer. In a preferred embodiment, the polymerization inhibitor is a tertiary amine.

In one embodiment, the nonaqueous electrolyte of this invention further comprises a solid porous separator. In one embodiment, the solid porous separator is a porous polyolefin separator. In one embodiment, the solid porous separator comprises a microporous pseudo-boehmite layer. In one embodiment, the solid porous separator of the nonaqueous electrolyte does not melt at a temperature which is greater than 100° C. and which is the lowest temperature at which polymerization of the multifunctional monomer rapidly occurs to increase the viscosity and internal resistivity of the electrolyte.

In one embodiment, the multifunctional monomer in the nonaqueous electrolyte of the cell does not polymerize if kept at a temperature of 60° C. for 72 hours. In one embodiment, the multifunctional monomer in the nonaqueous electrolyte of the cell does not polymerize if kept at a temperature of 80° C. for 72 hours.

In one embodiment, the multifunctional monomer in the nonaqueous electrolyte of the cell of the present invention does not rapidly polymerize at temperatures less than 100° C. In one embodiment, the multifunctional monomer in the nonaqueous electrolyte of the cell of the present invention does not rapidly polymerize at temperatures less than 110° C. In one embodiment, the multifuictional monomer in the nonaqueous electrolyte of the cell of the present invention does not rapidly polymerize at temperatures less than 120° C. In one embodiment, the multifuictional monomer in the nonaqueous electrolyte of the cell of the present invention does not rapidly polymerize at temperatures less than 130° C. In one embodiment, the multifunctional monomer in the nonaqueous electrolyte of the cell of the present invention does not rapidly polymerize at temperatures less than 150° C. In one 1 embodiment, the multifunctional monomer in the nonaqueous electrolyte of the cell of the present invention does not rapidly polymerize at temperatures less than 170° C.

Another aspect of the present invention pertains to a method of preparing a nonaqueous electrolyte for use in an electric current producing cell, the electrolyte having a viscosity and an internal resistivity, the method comprising the steps of (a) preparing a solution of one or more solvents; one or more ionic salts; and a multifunctional monomer comprising two or more unsaturated aliphatic reactive moieties per molecule, which multiflntional monomer is soluble in said one or more solvents, which multifunctional monomer rapidly polymerizes when the electrolyte is heated to an initiation temperature greater than 100° C., thereby increasing the viscosity and internal resistivity of the electrolyte; and, (b) optionally combining said solution with other materials selected from the group consisting of: solid porous separators, ionically conductive polymers, and monoftuctional monomers having one unsaturated aliphatic reactive moiety per molecule. The multifunctional monomer rapidly polymerizes when the electrolyte is heated to an initiation temperature greater than 100° C., thereby increasing the viscosity and internal resistivity of the electrolyte and increasing the safety of the cell.

Still another aspect of the present invention pertains to an electric current producing cell comprising (i) a cathode, (ii) an anode, and (iii) a nonaqueous electrolyte interposed between said cathode and said anode, said electrolyte having a viscosity and an internal resistivity, said electrolyte comprising: (a) one or more solvents; (b) one or more ionic salts; and, (c) a multifunctional monomer comprising two or more unsaturated aliphatic reactive moieties per molecule, which multifuntional monomer is soluble in the one or more solvents, which multifunctional monomer rapidly polymerizes when the electrolyte is heated to an initiation temperature greater than 100° C., thereby increasing the viscosity and internal resistivity of the electrolyte. Upon the rapid polymerization of the multifunctional monomer, the viscosity and internal resistivity of the nonaqueous electrolyte is increased, thereby increasing the safety of the cell. In one embodiment, upon rapid polymerization of the electrolyte at the initiation temperature, the viscosity and internal resistivity of the electrolyte increase to a level sufficient to safely terminate current producing operation of the cell.

In one embodiment, the electric current producing cell is a secondary battery.

In one embodiment, the cathode of the cell of the present invention comprises an electroactive transition metal chalcogenide. In another embodiment, the cathode comprises an electroactive conductive polymer. In another embodiment, the cathode comprises an electroactive sulfur-containing material. In one embodiment, the electroactive sulfur-containing material of the cathode comprises elemental sulfur. In one embodiment, the cathode comprises an electroactive sulfur-containing material which, in its oxidized state, comprises a disulfide group.

In one embodiment, the cathode of the cell of the present invention comprises an electroactive sulfur-containing material, wherein the electroactive sulfur-containing cathode material, in its oxidized state, comprises a polysulfide moiety of the formula, —$S_m$—, wherein m is an integer equal to or greater than 3, preferably m is an integer from 3 to 10, and more preferably m is an integer from 6 to 10. In a most preferred embodiment, the electroactive sulfur-containing cathode material is a carbon-sulfur polymer. In one embodiment, the electroactive sulfur-containing cathode material comprises a carbon-sulfur polymer selected from the group consisting of: carbon-sulfur polymer materials with their —$S_m$— groups, as described above, covalently bonded by one or more of their terminal sulfur atoms on a side group on the polymer backbone chain; carbon-sulfur polymer materials with their —$S_m$— groups, as described above, incorporated into the polymer backbone chain by covalent bonding of their terminal sulfur atoms; and carbon-sulfur polymer materials with greater than 75 weight per cent of sulfur in the carbon-sulfur polymer material.

In one embodiment, the anode of the cell comprises one or more materials selected from the group consisting of: lithium metal, lithium-aluminum alloys, lithium-tin alloys, lithium-intercalated carbons, and lithium-intercalated graphites.

Yet another aspect of the present invention pertains to a method of forming an electric current producing cell, the method comprising the steps of: (i) providing a cathode; (ii) providing an anode; and, (iii) interposing a nonaqueous electrolyte between the anode and the cathode, said electrolyte having a viscosity and an internal resistivity, the electrolyte comprising: (a) one or more solvents; (b) one or more ionic salts; and, (c) a multifunctional monomer comprising two or more unsaturated aliphatic reactive moieties per molecule, which multifuntional monomer is soluble in the one or more solvents, which multifunctional monomer rapidly polymerizes when the electrolyte is heated to an initiation temperature greater than 100° C., thereby increasing the viscosity and internal resistivity of the electrolyte.

Still another aspect of the present invention pertains to a method for increasing the safety of an electric current producing cell comprising the steps of (i) providing a nonaqueous electrolyte, the electrolyte having a viscosity and an internal resistivity, the electrolyte comprising: (a) one or more solvents; (b) one or more ionic salts; and, (c) a multifunctional monomer comprising two or more unsaturated aliphatic reactive moieties per molecule, which multifuntional monomer is soluble in the one or more solvents, which multifunctional monomer rapidly polymerizes when the electrolyte is heated to an initiation temperature greater than 100° C., thereby increasing the viscosity and internal resistivity of the electrolyte; and, (ii) incorporating said electrolyte into an electric current producing cell by interposing said electrolyte between a cathode and an anode. In one embodiment, upon rapid polymerization of the electrolyte at the initiation temperature, the viscosity and internal resistivity of the electrolyte increase to a level sufficient to safely terminate current producing operation of the cell.

Additional preferred embodiments are described below. As will be appreciated by one of skill in the art, features of one aspect or embodiment of the invention are also applicable to other aspects or embodiments of the invention.

DETAILED DESCRIPTION OF THE INVENTION

Nonagueous Electrolytes

Figure 1:
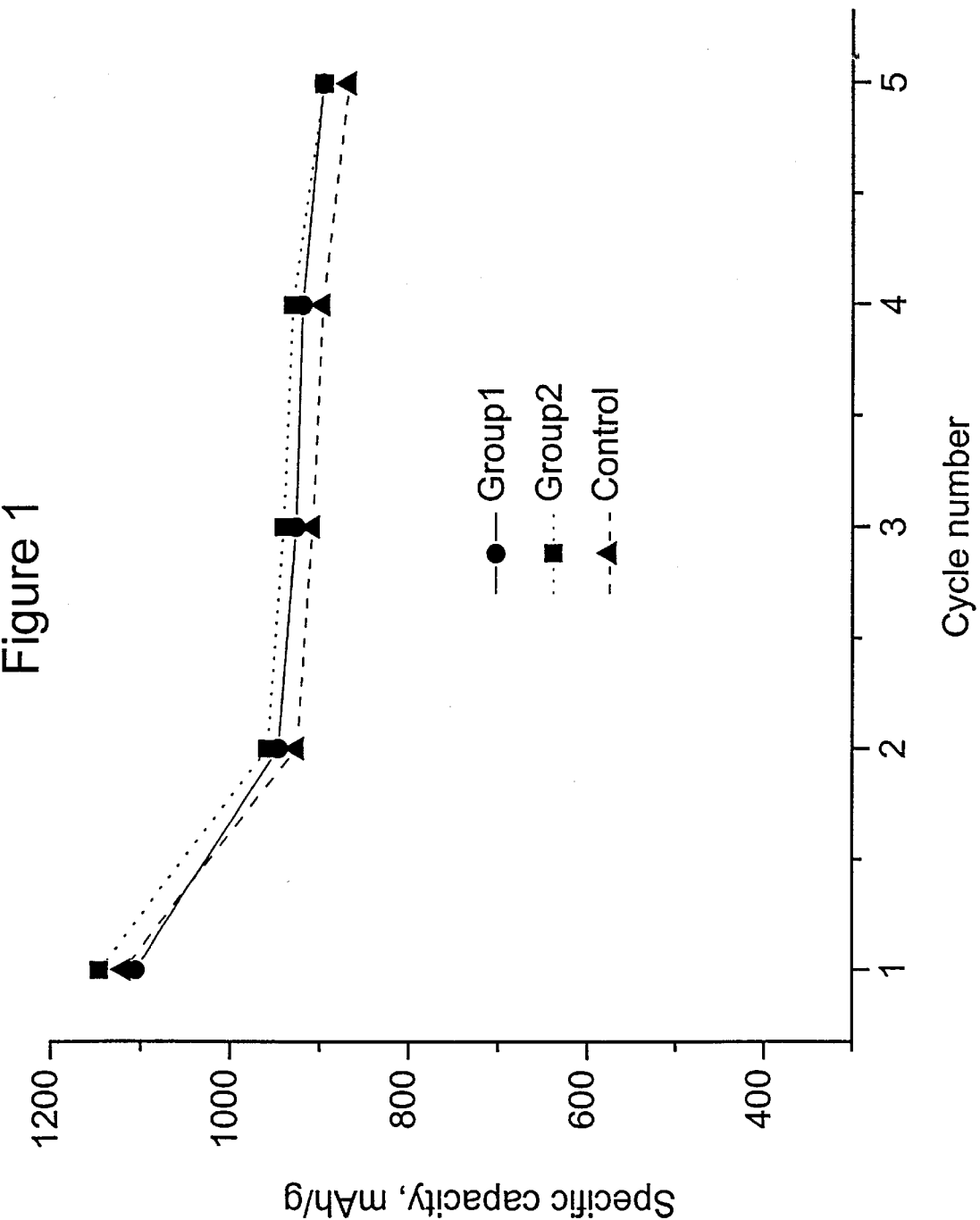
FIG. 1 shows the specific capacity versus cycle number for a control cell and cells containing DVETEG in the electrolyte, as described in Example 2.

One aspect of the present invention pertains to a non-aqueous electrolyte for use in an electric current producing cell, the electrolyte having a viscosity and an internal resistivity, the electrolyte comprising (a) one or more solvents; (b) one or more ionic salts; and, (c) a multifunctional monomer comprising two or more unsaturated aliphatic reactive moieties per molecule, which multifuntional monomer is soluble in said one or more solvents, which multifunctional monomer rapidly polymerizes when said electrolyte is heated to an initiation temperature greater than 100° C., thereby increasing said viscosity and internal resistivity of said electrolyte. This polymerization increases the viscosity and internal resistivity of the electrolyte and increases the safety of the cell. In one embodiment, upon rapid polymerization of the electrolyte at the initiation temperature, the viscosity and internal resistivity of the electrolyte increase to a level sufficient to safely terminate current producing operation of the cell.

The safety protection provided by the presence of polymerizable multifunctional monomers in the nonaqueous electrolyte of this invention is adapted for use with a wide variety of combinations of nonaqueous electrolyte compositions, of cathode active materials and solid composite cathodes, and of anodes in electric current producing cells. The nonaqueous electrolytes of the present invention are particularly preferred for use in electrolytic cells, primary batteries, rechargeable batteries, fuel cells, and the like, which require high energy density and, most particularly, those which utilize electroactive sulfur-containing cathodes.

Multifunctional Monomers

The term "multiflnctional monomer," as used herein, pertains to molecules of low molecular weight (typically below about 6000) which possess two or more unsaturated aliphatic reactive moieties per molecule.

The term "reactive moiety," as used herein, pertains to a chemical moiety comprising two or more atoms, which is part of a larger molecule, and which can react with a similar or different reactive moiety on another molecule to form a product molecule of higher molecular weight. The term "aliphatic reactive moiety," as used herein, pertains to a reactive moiety comprising two or more atoms, which is linear or branched and is neither itself cyclic nor part of a cyclic moiety in the molecule, as the molecule exists at room temperature in a pure state. The term "unsaturated aliphatic reactive moiety," as used herein, pertains to an aliphatic reactive moiety which comprises a reactive double bond such as, for example, the carbon-carbon double bond or unsaturated vinyl group in a vinyl ether.

For example, a divinyl ether, such as, for example, the divinyl ether of ethylene glycol (i.e., $CH_2$=CHOCH$_2$CH$_2$OCH=CH$_2$), is an example of a multifunctional monomer, because each molecule has two unsaturated aliphatic reactive moieties (i.e., —CH=CH$_2$) that can react with another vinyl ether moiety or another type of reactive moiety in a second molecule to form a molecule of higher molecular weight. By contrast, for example, a vinyl ether, such as, for example, the vinyl ether of 1-butanol, is not a multifunctional monomer because, although it can be polymerized through the reactive moiety to a molecule of higher molecular weight, it has only one unsaturated aliphatic reactive moiety, a single vinyl moiety, per molecule. Also by contrast, for example, 1,3-dioxolane is not a multifunctional monomer because, although it can polymerize under some conditions to form a molecule of higher molecular weight, 1,3-dioxolane does not have an unsaturated aliphatic reactive moiety and polymerizes through a ring-opening mechanism of its cyclic functional moiety, the acetal linkage.

Examples of suitable unsaturated aliphatic reactive moieties include, but are not limited to, vinyl (CH$_2$=CH—), allyl (CH$_2$=CH—CH$_2$—), vinyl ether (CH$_2$=CH—O—), allyl ether (CH$_2$=CH—CH$_2$—O—), allyl ester (CH$_2$=CH—CH$_2$—C(O)—O—), allyl amine (CH$_2$=CH—CH$_2$—NH—), acrylyl (CH$_2$=CH—C(O)—), acrylate (CH$_2$=CH—C(O)—O—), acrylamide (CH$_2$=CH—C(O)—NH—), methacrylyl (CH$_2$=C(CH$_3$)—C(O)—), methacrylate (CH$_2$=C(CH$_3$)—C(O)—O—), and crotoxyl (CH$_3$—CH=C(CH$_3$)—C(O)—), moieties.

Suitable multifunctional vinyl ether monomers of the nonaqueous electrolyte of the present invention include, but are not limited to, vinyl ethers selected from the group consisting of: divinyl ether monomers, trivinyl ether monomers, and tetravinyl ether monomers. In a preferred embodiment, the multifunctional monomer is a divinyl ether monomer.

Suitable divinyl ether monomers include, but are not limited to, divinyl ethers of aliphatic diols, such as, for example, divinyl ethers of alkane diols and divinyl ethers of polyoxyalkylene diols (e.g., polyethylene glycols and polypropylene glycols).

Examples of divinyl ethers of an alkane diol include, but are not limited to, the divinyl ethers of 1,2-ethanediol (e.g., ethylene glycol), 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, and 1,12-dodecanediol, of the formula CH$_2$=CH—O—(CH$_2$)$_n$—O—CH=CH$_2$, wherein n is an integer from 2 to 12.

Examples of suitable divinyl ether monomers of a polyoxyalkylene diol include, but are not limited to, the divinyl ethers of diethylene glycol, triethylene glycol, tetraethylene glycol, pentaethylene glycol, hexaethylene glycol, heptaethylene glycol, octaethylene glycol, nonaethylene glycol, decaethylene glycol, and further polyalkylene glycols of the formula CH$_2$=CH—O—(CH$_2$CH$_2$O)$_n$—CH=CH$_2$, where n is an integer from 2 to about 135 (i.e., a molecular weight of less than about 6000).

In a most preferred embodiment, the multifunctional monomer of the nonaqueous electrolyte of present invention is selected from the group consisting of: divinyl ether of ethylene glycol, divinyl ether of diethylene glycol, divinyl ether of triethylene glycol, divinyl ether of tetraethylene glycol, divinyl ether of 1,4-butanediol, and divinyl ether of 1,4-cyclohexanedimethanol.

The multifunctional nature of the monomers of the nonaqueous electrolyte of the present invention allows them to undergo crosslinking reactions during their polymerization reactions, typically to form a three-dimensional or network structure that is insoluble in the nonaqueous electrolyte and rapidly produces a more gelled or solid state. While not wishing to be bound to a particular theory, it is believed that the crosslinking reactions of the multifunctional monomers allow a more rapid buildup of the viscosity of the electrolyte than would occur with only non-crosslinking polymerization. This more rapid buildup of viscosity provides more rapid response to safely counteracting overheating and thermal runaway of the cell and, if the rapid polymerization is selected to be of sufficient speed and quantity, to shutting down the operation of the electric current producing cell at the high temperature that initiated the rapid polymerization. Also, this efficient viscosity buildup by crosslinking reactions during polymerization would allow a lower concentration of the polymerizable monomer to be utilized in the electrolyte, which would in turn reduce the likelihood that the monomer additive would interfere with the electrochemical performance and stability of the electrolyte under normal operating conditions. Monofunctional monomers, whether aliphatic or cyclic, do not by themselves undergo crosslinking reactions and would not provide the benefits of rapid crosslinking to a more gelled or solid state, rapid viscosity buildup at low concentrations of polymerized monomer, and rapid safety response, including shutdown of the operation of the cell at high temperatures, combined with stability and good electrochemical functionality at normal operating temperatures at relatively low concentrations of monomer.

The multifunctional monomers of the nonaqueous electrolyte of this invention are soluble in the one or more solvents of the nonaqueous electrolyte of this invention. This solubility is determined by the complete dissolution or miscibility of the one or more multifunctional monomers in the one or more solvents of the nonaqueous electrolyte of this invention at a weight ratio of the multifunctional monomers to the one or more solvents in the nonaqueous electrolyte sufficient to provide the desired safety protection.

Although the multifunctional monomer may have the properties of a solvent when alone or when in combination with the solvents of the nonaqueous electrolyte, for the purposes of calculating the weight ratio, as used in this invention, the weight of the multifunctional monomers is not included in the weight of the solvents. Suitable weight ratios of the combined total weight of the multifunctional monomers present to the combined total weight of the one or more solvents in the nonaqueous electrolyte of this invention include, but are not limited to, a weight ratio in the range of 0.01:1 to 0.25:1, preferably the weight ratio is in the range of 0.02:1 to 0.15:1, and more preferably the weight ratio is in the range of 0.02:1 to 0.1:1. For example, a solution consisting of 5 per cent by volume solution of the divinyl ether of triethylene glycol (as multifunctional monomer) (density 1.0016 g/cm$^3$), 90 per cent by volume 1,2-dimethoxyethane (density 0.867 g/cm$^3$), and 5 per cent by volume o-xylene (density 0.87 g/cm$^3$) (the 1,2-dimethoxyethane and o-xylene together are the nonaqueous electrolyte solvent) would have a weight ratio of the multifunctional monomer to the combined solvents of [(0.05) (1.0016)]/[(0.90)(0.867)+(0.05)(0.87)] or 0.061 to 1

When the weight ratio of the combined total weight of the multifunctional monomers present to the combined total weight of solvents in the nonaqueous electrolyte of this invention is less than 0.01:1, there is a tendency for the amount of multifunctional monomer to be insufficient at the threshold initiation temperature to cause rapid polymerization with crosslinking and its associated large viscosity buildup to rapidly and safely control or terminate the operation of the electric current producing cell. When the weight ratio of the combined total weight of the multifunctional monomers present to the combined total weight of the one or more solvents in the nonaqueous electrolyte of the present invention is greater than 0.25:1, there is a tendency for the amount of multifuictional monomer to be too high at the threshold initiation temperature such that its rapid polymerization with crosslinking may produce sufficient exothermic reactions that the heat produced contributes to additional thermal runaway in the cell rather than to safely stopping the thermal runaway and to safely terminating the operation of the cell.

In one embodiment, the multifunctional monomer of the nonaqueous electrolyte of the present invention is a multifunctional vinyl ether monomer. The multifuictional vinyl ether monomers, even at weights as low as 1 per cent of the weight of the solvents in the electrolyte, generally have the combined features of (1) not reacting substantially and remaining stable in the nonaqueous electrolytes of the present invention while not significantly interfering with the electrochemistry of the cell during discharging, charging, and storage under normal operating temperatures and conditions; and (2) providing reactivity at temperatures above the normal operating temperatures of the electrolyte in the cell, such as temperatures greater than 100° C., at which rapid polymerization with crosslinking causes a rapid viscosity buildup and increase in the internal resistivity of the electrolyte.

The multifunctional monomer of the nonaqueous electrolyte of the present invention rapidly polymerizes when the electrolyte is heated to an initiation temperature greater than 100° C., thereby increasing said viscosity and internal resistivity of said electrolyte. Methods of measuring (in absolute or relative terms) the viscosity and internal resistivity of a material, such as the nonaqueous electrolyte of the present invention, are well known to those of skill in the art.

The terms "polymerizes rapidly" or "rapid polymerization," as used herein, pertains to a polymerization which is more than 50 per cent complete within 10 minutes under the specific reaction conditions utilized. In situations of thermal runaway in a battery, the polymerization should typically proceed sufficiently within a few seconds to increase the viscosity and internal resistivity enough to safely slow or stop the thermal runaway.

The initiation temperature is greater than 100° C., and is typically from 100° C. to about 200° C. In one embodiment, the initiation temperature is greater than 110° C. In one embodiment, the initiation temperature is greater than 120° C. In one embodiment, the initiation temperature is greater than 130° C. In one embodiment, the initiation temperature is greater than 140° C. In one embodiment, the initiation temperature is greater than 150° C. In one embodiment, the initiation temperature is greater than 160° C. In one embodiment, the initiation temperature is greater than 170° C.

Although the multifunctional monomers of the nonaqueous electrolyte of the cell of this invention polymerizes rapidly at an initiation temperature greater than 100° C., they must not polymerize to a sufficient extent at temperatures within the normal operating range of the cell such that the operation of the cell is terminated or adversely affected. In one embodiment, the multifunctional monomer of the nonaqueous electrolyte of the cell of this invention does not polymerize (polymerization less than 10 per cent complete, more preferably less than 5 per cent complete) if kept at a temperature of 60° C. for 72 hours. In one embodiment, the multifunctional monomer of the nonaqueous electrolyte of the cell of this invention does not polymerize (polymerization less than 10 per cent complete, more preferably less than 5 per cent complete) if kept at a temperature of 80° C. for 72 hours. In one embodiment, the multifunctional monomer in the nonaqueous electrolyte of the cell of this invention does not rapidly polymerize at temperatures less than 100° C. In one embodiment, the multifunctional monomer in the nonaqueous electrolyte of the cell of this invention does not polymerize rapidly at temperatures less than 110° C. In one embodiment, the multifunctional monomer in the nonaqueous electrolyte of the cell of this invention does not polymerize rapidly at temperatures less than 120° C. In one embodiment, the multifunctional monomer in the nonaqueous electrolyte of the cell of this invention does not polymerize rapidly at temperatures less than 130° C. In one embodiment, the multifunctional monomer in the nonaqueous electrolyte of the cell of this invention does not polymerize rapidly at temperatures less than 150° C. In one embodiment, the multifunctional monomer in the nonaqueous electrolyte of the cell of this invention does not polymerize rapidly at temperatures less than 170° C.

Although cells typically operate within the range −20° C. to 50° C. in an office environment and at outdoor temperatures during outdoor use, they need to be capable of operating at even higher temperatures to accommodate possible storage at higher temperatures and normal heat build up in the cell during continuous operation. For example, depending on the particular application and on the specific combination of anode, electrolyte, and cathode materials utilized for the application, the normal operating temperatures specified for of electric current producing cells typically have an upper limit of about 60° C. and often extend to somewhere in the range of 60° C. to 100° C. These upper temperature limits are typically for short durations of time, such as 8 hours or less, with the regular operating temperatures being in the range of −20° C. to 50° C. Safety testing at high temperatures for batteries is typically conducted at 130° C. for 60 minutes or at 150° C. for 10 minutes. Thus, these high temperatures above 100° C. represent the range of temperatures where the battery should have safety protection against thermal runaway and should either safely control, or even terminate, operation at or below these temperatures before thermal runaway or any other safety failure of the cell occurs.

Since the polyolefin separators typically used in many batteries irreversibly soften and melt at temperatures in the range of about 120° C. to about 150° C., depending on the particular polyolefin utilized, and the resulting loss of dimensional stability may contribute to a safety failure, it is desirable to have a temperature-induced safety mechanism in the battery, such as the multifunctional monomer in the nonaqueous electrolyte in the cells of this invention, which can safely control, or even terminate, the operation of the cell at a temperature before the polyolefin separator significantly loses dimensional stability.

The increase in viscosity provided by the rapid polymerization of the multifunctional monomer of the present invention is particularly useful in improving the safety characteristics of cells, such as those with cathodes comprising electroactive sulfur-containing materials, where the cathode-active materials are at least partially present in the liquid phase of the electrolyte of the cell during cycling, in which a melt-type shutdown separator, such as a specially constructed porous polyolefin separator, may not prevent the contact of cathode-active materials in this liquid phase with lithium-based anodes under abusive conditions. The retarding of mass transfer at the lithium/electrolyte interface and the general reduction of diffusion by the increase in viscosity by the rapid polymerization of the multifunctional monomer of this invention are useful in improving the safety characteristics of these types of cells with cathode-active materials in a liquid phase during cell usage. Also, when the battery contains lithium in some form as the anode active material, the melting point of the lithium-based material in whatever form it is present in the anode, including after undergoing many discharge-charge cycles, represents a temperature below which the safety protection in the cell should be effective. For example, the melting point of lithium metal is about 180° C. so the safety protection in batteries containing lithium metal should activate and prevent the temperature of these batteries from going above some lower temperature, such as, for example, 170° C. at the most.

Since the solvents in nonaqueous electrolytes are typically flammable, especially in the presence of lithium metal in any form with which the solvents typically react rapidly at high temperatures, it is desirable that the temperature-induced safety control, or even safety shutdown, in batteries, especially lithium-based batteries, be at a temperature only slightly above the normal operating temperature range of the battery. Also, because batteries are transported and utilized in many portable devices, there is an awareness of the need for extensive safety testing and for a high level of safety requirements on the batteries. Thus, a rapid temperature-induced safety control mechanism, such as shutdown, at temperatures slightly above the normal operating temperatures of the battery, for example at some temperature in the range of 100° C. to 120° C., would provide useful protection against thermal runaway or failure of one of the safety tests under high temperatures or under one of the other modes of abuse of the battery, such as, for example, the nail puncture test, that can lead to increased temperatures in the battery.

Depending on the application for the battery and the particular cathode, anode, separator, and other materials present in the battery, it may be desirable to have a specific threshold initiation temperature for safety control, or even shutdown, of the battery by the multifunctional monomers of the nonaqueous electrolyte of the cells of this invention. For example, when the separator utilized in the battery contains polypropylene which melts at about 150° C., it may be desirable to have the battery capable of operating up to temperatures as high as 110° C., but have the temperature-induced safety control or shutdown by the multifunctional monomer occur at some temperature in the range of 115° C. to 130° C.

By the proper selection of the one or more multifunctional monomers and their weight ratio with the one or more solvents of the nonaqueous electrolyte of the cells of this invention, as well as with the optional use of a monofunctional monomer, a polymerization initiator, and a polymerization inhibitor, as described herein, the desired combination of stability at normal operating temperatures and conditions and rapid temperature-induced safety control or safety termination of the battery operation at a specific initiation temperature greater than 100° C. may be achieved. Depending on the selection of the materials and on the temperature that the electrolyte is exposed to for initiation of the polymerization of the multifunctional monomer and any subsequent temperature increases in the cell due to, for example, continued thermal runaway, or exothermic effects from the polymerization, the nonaqueous electrolytes of the cells of this invention may provide a variety of levels of increase in viscosity and internal resistivity resulting in a wide variety of cell safety conditions.

For example, where the temperature-induced increase in viscosity and internal resistivity only lowers the ionic conductivity of the electrolyte by a factor of 2, the cell may stop or the cell may protect against thermal runaway and then return to normal use with acceptable battery performance even with this decreased ionic conductivity. Also, the cell may have a better safety performance, if subsequently exposed to elevated temperatures, than it had initially before the temperature-induced rapid polymerization. If desired to increase safety of the cell, this polymerization of the multifunctional monomers to give a small decrease in ionic conductivity could be done prior to discharge-charge use of the cell by heating the cell to an elevated temperature, such as greater than 100° C. for rapid polymerization or at lower than 100° C. for a slower polymerization to polymerize some or all of the multifunctional monomer. Also, for example, where the temperature-induced increase in viscosity and internal resistivity lowers the ionic conductivity of the electrolyte by a factor of 1,000 or more, the cell may safely protect against overheating and thermal runaway, while also shutting down or terminating its current producing operation.

When the battery contains a separator material, it is generally desirable that the safety control or safety termination of the battery occurs at a temperature below the temperature at which the separator loses its dimensional stability in a way that may contribute directly to safety failure, for example, by resulting in a direct short between the electrodes. In one embodiment, the solid porous separator of the nonaqueous electrolyte of the cell of this invention does not melt at the initiation temperature greater than 100° C. at which the rapid polymerization of the multifunctional monomer of the nonaqueous electrolyte of the cell of this invention occurs to increase the viscosity and internal resistivity of the electrolyte and to increase the safety of the cell.

In contrast to the present invention, where multifunctional monomers (such as, for example, multifunctional vinyl ether monomers) are present in a nonaqueous electrolyte, which monomers remain stable during the operation of the cell at normal operating temperatures and conditions and which polymerize rapidly at high initiation temperatures to safely control or terminate the operation of the cell, U.S. Pat. No. 5,411,819 to Marchese et al. describes a process for preparing a solid polymer electrolyte by radiation curing of a mixture containing a vinyl ether, a divinyl ether, an ionic compound, an oligomer or a dipolar aprotic liquid, and a photoinitiator. Thus, the '819 solid polymer electrolyte contains a polymer of vinyl ether and divinyl ether in a solid membrane form and does not contain multifunctional divinyl ether monomers soluble in the solvents of the nonaqueous electrolyte. In the presence of lithium tetrafluoroborate, the polymerization of the vinyl ethers in the '819 patent is stated to occur spontaneously. Also, the radiation-induced polymerization process in the '819 patent is said to be accelerated by heating at a temperature of around 50° C.

Solvents

Examples of useful solvents for the nonaqueous electrolytes of the present invention include, but are not limited to, one or more solvents selected from the group consisting of: N-methyl acetamide, acetonitrile, organic carbonates, sulfolanes, sulfones, N-alkyl pyrrolidones, dioxolanes, glymes, siloxanes, xylenes, and substituted forms of the foregoing.

Salts

Examples of ionic electrolyte salts for use in the nonaqueous electrolyte of the present invention include, but are not limited to, $MClO_4$, $MAsF_6$, $MSO_3CF_3$, $MSO_3CH_3$, $MBF_4$, MBr, MI, MSCN, $MB(Phenyl)_4$, $MPF_6$, $MC(SO_2CF_3)_3$, $MN(SO_2CF_3)_2$,

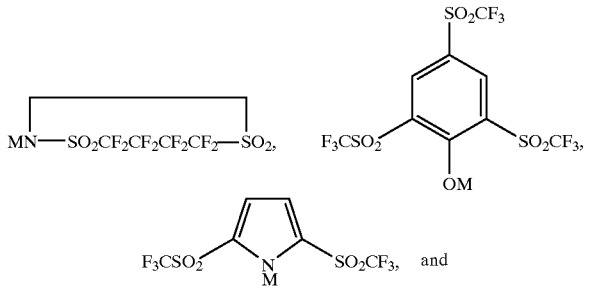

the like, where M is Li or Na. Other electrolyte salts useful in the practice of this invention are disclosed in U.S. Pat. No. 5,538,812 to Lee et al. Preferred ionic electrolyte salts are $LiSO_3CF_3$ (lithium triflate), and $LiN(SO_2CF_3)_2$ (lithium imide).

Monofunctional Monomers

In one embodiment, the nonaqueous electrolyte of the present invention further comprises a monofunctional monomer having one unsaturated aliphatic reactive moiety per molecule, which monofunctional monomer is soluble in the one or more solvents of the electrolyte wherein the monoftuctional monomer rapidly reacts with the multifunctional monomer when the electrolyte is heated to an initiation temperature greater than 100° C. The term "monofunctional monomer," as used herein, pertains to a molecule of low molecular weight (e.g., below about 6000) which possesses only one unsaturated aliphatic reactive moiety. For example, a vinyl ether, such as, for example, the vinyl ether of 1-butanol (i.e., $CH_2=CH-O-CH_2CH_2CH_2CH_3$), is a monofunctional monomer because it has only one aliphatic reactive moiety, a single vinyl moiety, per molecule.

As described previously herein, monofunctional monomers do not by themselves undergo crosslinking reactions with its associated benefits for rapid viscosity buildup and safety properties of the nonaqueous electrolyte of the present invention, but monofunctional monomers, in combination with the multifunctional monomers of this invention, may participate advantageously in the rapid polymerization by providing, for example, an improved combination of stability of the nonaqueous electrolyte at the operating temperatures of the cell with rapid but controlled viscosity buildup and increase in internal resistivity of the cell at an initiation temperature greater than 100° C.

The monofunctional monomers for use in the nonaqueous electrolyte of this invention are soluble in the one or more solvents of the nonaqueous electrolyte of this invention. This solubility is determined by the complete dissolution or miscibility of the monofunctional monomers in the solvents of the nonaqueous electrolyte of this invention at a weight ratio of the combined total weight of the monofunctional monomers present to the combined total weight of the solvents and multifunctional monomers present in the nonaqueous electrolyte necessary to provide the desired safety protection, for example at a weight ratio of the combined total weight of the monofunctional monomers present to the combined total weight of the one or more solvents and the multifunctional monomers present in the range of, but not limited to, 0.005:1 to 0.2:1, and preferably, 0.01:1 to 0.1:1. For the purposes of calculating this weight ratio for the presence of monofunctional monomers, as used in this invention, the weight of the multifunctional monomers present in the solvent is combined with the weight of the solvents.

In a preferred embodiment, the monofunctional monomer for use in the nonaqueous electrolyte of this invention is a monofunctional monomer selected from the group consisting of: vinyl ethers and allyl ethers. In a more preferred embodiment, the monofunctional monomer is a vinyl ether selected from the group consisting of: vinyl ether of 1-butanol, vinyl ether of 2-ethylhexanol, and vinyl ether of cyclohexanol.

The monofunctional vinyl ether and allyl ether monomers generally have the feature of not reacting substantially and remaining stable in the nonaqueous electrolytes of the present invention while not significantly interfering with the electrochemical performance of the cell during discharging, charging, and storage at normal operating temperatures and conditions.

At temperatures above the normal operating range of the electrolyte in the cell, such as greater than 100° C., these monofunctional monomers polymerize in combination with the crosslinking reactions of the multifunctional monomers at or above an initiation temperature greater than 100° C. to contribute to the rapid viscosity buildup and increase in the internal resistivity of the electrolyte.

Polymerization Initiators

In one embodiment, the nonaqueous electrolyte of the present invention further comprises a polymerization initiator to increase the rate of polymerization of the multifunctional monomer. Suitable initiators include free radical polymerization initiators and cationic polymerization initiators.

Examples of suitable free radical polymerization initiators include, but are not limited to, acyl peroxides, such as, for example, diacetyl peroxide, dibenzoyl peroxide, and dilauryl peroxide; peresters, such as, for example, tert-butylperoxy pivalate, tert-butyl peroxy-2-ethylhexanoate; alkyl peroxides, such as, for example, di-tert-butyl peroxide; percarbonates, such as, for example, dicyclohexyl peroxydicarbonate; and azo compounds, such as, for example, 2,2'-azobis(isobutyronitrile), 2,2'-azobis(2,4-dimethylvaleronitrile), 1,1'-azobis(cyanocyclohexane), and 2,2'-azobis(methylbutyronitrile).

In a preferred embodiment, the polymerization initiator comprises a cationic polymerization initiator. Suitable cationic polymerization initiators include, but are not limited to, hydrogen ions, and Lewis acids such as, for example, halides of boron, zinc, aluminium, iron and tin.

In a more preferred embodiment, the polymerization initiator comprises lithium ions, typically in combination with counter anions that are poor nucleophiles, and optionally complexed with ether-containing molecules such as, for example, with glymes.

The amount of the free radical and cationic polymerization initiators for use in the present invention may vary widely, depending on the stability required at the normal operating temperatures and conditions of the nonaqueous electrolyte in the cell and on the temperature threshold for initiation of rapid polymerization and rate of polymerization desired at high temperatures to safely control or even terminate the operation of the cell. Generally, about 0.1 to 5.0% of polymerization initiator is used, based on the combined total weight of multifunctional and monofunctional monomers present in the nonaqueous electrolyte.

Polymerization Inhibitors

In one embodiment, the nonaqueous electrolyte of the present invention further comprises a polymerization inhibitor to decrease the rate of polymerization of the multifunctional monomer.

In a preferred embodiment, the polymerization inhibitor comprises a tertiary amine. Examples of suitable tertiary amines include, but are not limited to, triethylamine, tripropylamine, tributylamine, tribenzylamine, trioctylamine, triphenylamine, and methylpiperidine.

The amount of the polymerization inhibitors for use in the present invention may vary widely, depending on the stability required at the normal operating temperatures and conditions of the nonaqueous electrolyte in the cell in combination with the temperature threshold for initiation of rapid polymerization and the rate of polymerization desired at high temperatures for safe operation of the cell. Generally, about 0.05 to 5.0% of polymerization inhibitor is used, based on the combined total weight of multifunctional and monofunctional monomers in the nonaqueous electrolyte.

State of Nonagueous Electrolyte

The nonaqueous electrolyte of the present invention may be any of the types of nonaqueous electrolytes known in the art. In one embodiment, the nonaqueous electrolyte of the present invention is selected from the group consisting of: liquid electrolytes, gel polymer electrolytes, and solid polymer electrolytes. In a preferred embodiment, the electrolyte is a liquid electrolyte.

To form a liquid electrolyte of the present invention, one or more ionic electrolyte salts is typically added to one or more electrolyte solvents and the one or more multifunctional monomers. Other optional additives, such as for example, monofunctional monomers, polymerization initiators, and polymerization inhibitors may also be added.

To form a gel polymer electrolyte of this invention, one or more ionic conductive polymers is typically added to one or more electrolyte solvents, one or more ionic electrolyte salts, and one or more multifunctional monomers. The amount of electrolyte solvents and multifunctional monomers results in a gel or semi-solid state of the electrolyte in contrast to the solid state of a solid polymer electrolyte.

Examples of suitable ionic conductive polymers include, but are not limited to, those selected from the group consisting of: polyethylene oxides (PEO), polypropylene oxides, polyacrylonitriles (PAN), polysiloxanes, polyimides, polyethers, sulfonated polyimides, polymerized divinyl polyethylene glycols, acrylate and methacrylate polymers and copolymers, such as polymerized polyethylene glycol-bis-(methyl acrylates) and polymerized polyethylene glycol-bis-(methyl methacrylates), derivatives of the foregoing, copolymers of the foregoing, and crosslinked and networked structures of the foregoing.

To form a solid polymer electrolyte of this invention, one or more ionic conductive polymers is typically added to one or more solvents (typically less than 20 per cent by weight of the total weight of electrolyte), one or more ionic electrolyte salts, and the multifunctional monomers present. Examples of suitable ionic conductive polymers include, but are not limited to, those selected from the group consisting of polyethers, polyethylene oxides (PEO), polypropylene oxides, polyimides, polyphosphazenes, polyacrylonitriles (PAN), acrylate and methacrylate polymers and copolymers, polysiloxanes, polyether grafted polysiloxanes, derivatives of the foregoing, copolymers of the foregoing, and crosslinked and networked structures of the foregoing. Tonically conductive solid polymer electrolytes may additionally function as separator materials between the anode and the cathode of an electric current producing cell.

Solid Porous Separators

In one embodiment, the nonaqueous electrolyte of the present invention further comprises a solid porous separator. Typically, the separator is a solid non-conductive or insulative material which separates or insulates the anode and the cathode from each other and which comprises one or more ionic electrolyte salts and solvents, and optionally ionic conductive polymers, in the pores of the separator.

A variety of materials are known in the art for use for the porous layer or separator in electric current producing cells. Suitable solid porous separator materials include, but are not limited to, polyolefins, such as, for example, polyethylenes and polypropylenes, glass fiber filter papers, and ceramic materials. Usually these separator materials are supplied as porous free standing films which are interleaved with the anodes and the cathodes in the fabrication of electric current producing cells.

Alternatively, the porous separator layer may be applied directly to one of the electrodes, for example, as described in U.S. Pat. No. 5,194,341 to Bagley et al. Further examples of separators suitable for use in this invention are those comprising a microporous pseudo-boehmite layer as described in U.S. patent application Ser. No. 08/995,089 to the common assignee by Carlson et al., titled "Separators for Electrochemical Cells," which may be provided either as a free standing film or by a direct coating application on one of the electrodes. In one embodiment, the solid porous separator is a porous polyolefin separator. In one embodiment, the solid porous separator comprises a microporous pseudo-boehmite layer.

Methods of Preparing Nonagueous Electrolytes

Another aspect of the present invention pertains to a method of preparing a nonaqueous electrolyte for use in an electric current producing cell, the electrolyte having a viscosity and an internal resistivity, the method comprising the steps of (a) preparing a solution of one or more solvents; one or more ionic salts; and a multifunctional monomer comprising two or more unsaturated aliphatic reactive moieties per molecule, which multifuntional monomer is soluble in said one or more solvents, which multifunctional monomer rapidly polymerizes when the electrolyte is heated to an initiation temperature greater than 100° C., thereby increasing the viscosity and internal resistivity of the electrolyte; and, (b) optionally combining said solution with other materials selected from the group consisting of: solid porous separators, ionically conductive polymers, and monofunctional monomers having one unsaturated aliphatic reactive moiety per molecule. The multifunctional monomer rapidly polymerizes when the electrolyte is heated to an initiation temperature greater than 100° C., thereby increasing the viscosity and internal resistivity of the electrolyte and increasing the safety of the cell.

Electric Current Producing Cells

Another aspect of the present invention pertains to an electric current producing cell comprising (i) a cathode, (ii) an anode, and (iii) a nonaqueous electrolyte interposed between said cathode and said anode, said electrolyte having a viscosity and an internal resistivity, said electrolyte comprising: (a) one or more solvents; (b) one or more ionic salts; and, (c) a multifunctional monomer comprising two or more unsaturated aliphatic reactive moieties per molecule, which multifuntional monomer is soluble in the one or more solvents, which multifunctional monomer rapidly polymerizes when the electrolyte is heated to an initiation temperature greater than 100° C., thereby increasing the viscosity and internal resistivity of the electrolyte. Upon the rapid polymerization of the multifunctional monomer, the viscosity and internal resistivity of the nonaqueous electrolyte is increased, thereby increasing the safety of the cell. In one embodiment, upon rapid polymerization of the electrolyte at the initiation temperature, the viscosity and internal resistivity of the electrolyte increase to a level sufficient to safely terminate current producing operation of the cell.

In the cells of the present invention, the multifunctional monomer rapidly polymerizes at some initiation temperature greater than 100° C., such as, for example, at a threshold polymerization temperature of 120° C., thereby rapidly increasing the viscosity of the solvent-containing portion of the nonaqueous electrolyte and safely controlling or even terminating the operation of the cell. This increase in viscosity improves the safety characteristics of the cell by effectively retarding mass transfer flows in the cell and by increasing the internal resistivity. This increased gelation of the electrolyte typically decreases the ionic conductivity by a factor of at least 2 to 10, thereby retarding mass transfer of ionic species at the electrode interfaces and generally inducing mass transfer diffusion limitations. This increased viscosity of the electrolyte is likely the main cause of the safety effects against overheating and thermal runaway and, if the viscosity increase is sufficiently large, of the safety shutdown effects of terminating the current operation of the cell. In a preferred embodiment, the multifunctional monomer is a multifunctional vinyl ether monomer, as described herein.

Although the electric current producing cell of the present invention may be utilized for a wide variety of primary and secondary batteries known in the art, it is preferred to utilize these cells in secondary or rechargeable batteries. The benefits of a temperature-induced polymerization of the multifunctional monomers of the cells of this invention may be employed to help the safety protection of secondary batteries through many repeated discharge and charge cycles when the anode and cathode active materials undergo many electrochemical reactions which may progressively lead to greater potential for thermal runaway and unsafe conditions at temperatures above the normal operating range and under other abusive conditions of cell usage.

Cathodes

Since the multifunctional monomer of the nonaqueous electrolytes of the present invention is present as a soluble species in the nonaqueous electrolyte and since the stability and reactivity of these multifunctional monomers (and particularly the multifunctional vinyl ether monomers) is typically relatively insensitive to the nature of the cathode active materials and their reduction or discharge products, a wide variety of cathodes may be utilized in the cells of this invention. Suitable cathodes for the cells of this invention include, but are not limited to, cathodes comprising cathode active materials selected from the group consisting of: electroactive transition metal chalcogenides, electroactive conductive polymers, and electroactive sulfur-containing materials. The term "electroactive," as used herein, pertains to the electrochemical property of a material which takes part in the electrochemical reaction of charge or discharge in an electric current producing cell.

In one embodiment, the cathode of the cell of the present invention comprises an electroactive transition metal chalcogenide. Suitable transition metal chalcogenides include, but are not limited to, the electroactive oxides, sulfides, and selenides of transition metals selected from the group consisting of: Mn, V, Cr, Ti, Fe, Co, Ni, Cu, Y, Zr, Nb, Mo, Ru, Rh, Pd, Hf, Ta, W, Re, Os, and Ir. Preferred transition metal chalcogenides are electroactive oxides of vanadium and manganese.

In one embodiment, the cathode of the cell of this invention comprises an electroactive conductive polymer. Suitable conductive polymers include, but are not limited to, electroactive and electronically conductive polymers selected from the group consisting of: polypyrroles, polyphenylenes, polythiophenes, and polyacetylenes. Preferred conductive polymers are polypyrroles and polyacetylenes.

In one embodiment, the cathode of the cell of the present invention comprises an electroactive sulfur-containing material. The term "sulfur-containing material," as used herein, refers to cathode active materials which comprise the element sulfur in any form, wherein the electrochemical activity involves the breaking or forming of sulfur-sulfur covalent bonds. The nature of the electroactive sulfur-containing materials useful in the cathodes of the cells of this invention may vary widely. The electroactive properties of elemental sulfur and of other sulfur-containing materials are well known in the art, and typically include the reversible formation of lithiated or lithium ion sulfides during the discharge or cathode reduction cycle of the battery.

In one embodiment, the electroactive sulfur-containing material of the cathodes of the cells of this invention comprises elemental sulfur. Examples of elemental sulfur as the electroactive cathode material are described in U.S. Pat. No. 3,639,174 to Kegelman, and in U.S. Pat. Nos. 5,523, 179, 5,532,077, 5,582,623 and 5,682,201 to Chu.

In one embodiment, the electroactive sulfur-containing material is organic, that is, it comprises both sulfur atoms and carbon atoms. In one embodiment, the electroactive sulfur-containing material is an organic material which, in its oxidized state, comprises a disulfide moiety. Examples of these organic disulfide materials include organo-sulfur materials as described in U.S. Pat. Nos. 4,833,048 and 4,917,974 to Dejonghe et al.; 5,162,175 and 5,516,598 to Visco et al.; and 5,324,599 to Oyama et al.

In one embodiment, the electroactive sulfur-containing material comprises an electroactive sulfur-containing material, wherein the sulfur-containing cathode material, in its oxidized state, comprises a polysulfide moiety of the formula, $-S_m-$, wherein m is an integer equal to or greater than 3, preferably m is an integer from 3 to 10, and more preferably m is an integer from 6 to 10. In a most preferred embodiment, the electroactive sulfur-containing material is a carbon-sulfur polymer. In one embodiment the electroactive sulfur-containing material comprises a carbon-sulfur polymer selected from the group of carbon-sulfur polymers comprising a polysulfide moiety of the formula, $-S_m-$, wherein m is an integer from 3 to 10, consisting of: carbon-sulfur polymer materials with their $-S_m-$ groups covalently bonded by one or more of their terminal sulfur atoms on a side group on the polymer backbone chain; carbon-sulfur polymer materials with their $-S_m-$ groups incorporated into the polymer backbone chain by covalent bonding of their terminal sulfur atoms; and carbon-sulfur polymer materials with greater than 75 weight per cent of sulfur in the carbon-sulfur polymer material. Examples of these carbon-sulfur polymer materials are described in U.S. Pat. Nos. 5,529,860; 5,601,947; and 5,609,702 to Skotheim et al.; and in U.S. patent application Ser. No. 08/995,122, titled "Electroactive, Energy-Storing, Highly Crosslinked, Polysulfide-Containing Organic Polymers for Use in Electrochemical Cells," to the common assignee by Gorkovenko et al. Owing to the presence of multiple linked sulfur atoms, $-S_m-$, where m is an integer from 3 to 10, in these carbon-sulfur polymer materials, they possess significantly higher energy densities or specific capacities when discharged or reduced than corresponding materials containing the disulfide linkage, —S—S—, alone.

Anodes

Since the multifunctional monomer of the nonaqueous electrolyte of the present invention is present as a soluble species in the nonaqueous electrolyte and since the stability and reactivity of this multifunctional monomer, and particularly a multifunctional vinyl ether monomer, with the anode active materials and the oxidation or discharge products of the anode active materials, is generally similar to that of the solvents in the nonaqueous electrolyte, a wide variety of anodes may be utilized in the cells of this invention.

Suitable anode active materials for the anodes of the electric current producing cells of the present invention include, but are not limited to, one or more metals or metal alloys or a mixture of one or more metals and one or more alloys, wherein said metals are selected from the Group IA and IIA metals in the Periodic Table. Examples of suitable anode active materials for the cells of the present invention include, but are not limited to, alkali-metal intercalated conductive polymers, such as, for example, lithium doped polyacetylenes, polyphenylenes, polypyrroles, and the like, and alkali-metal intercalated graphites and carbons. Anode active materials comprising lithium are especially useful. Preferred anode active materials for the anodes of the cells of this invention are lithium metal, lithium-aluminum alloys, lithium-tin alloys, lithium-intercalated carbons, and lithium-intercalated graphites.

Methods of Preparing Electric Current Producing Cells

Another aspect of the present invention pertains to a method of forming an electric current producing cell, the method comprising the steps of: (i) providing a cathode; (ii) providing an anode; and, (iii) interposing a nonaqueous electrolyte between thee anode and the cathode, said electrolyte having a viscosity and an internal resistivity, the electrolyte comprising: (a) one or more solvents; (b) one or more ionic salts; and, (c) a multifunctional monomer comprising two or more unsaturated aliphatic reactive moieties per molecule, which multifuntional monomer is soluble in the one or more solvents, which multifunctional monomer rapidly polymerizes when the electrolyte is heated to an initiation temperature greater than 100° C., thereby increasing the viscosity and internal resistivity of the electrolyte.

Methods of Increasing the Safety of Electric Current Producing Cells

Another aspect of the present invention pertains to a method for increasing the safety of an electric current producing cell comprising the steps of (i) providing a nonaqueous electrolyte, the electrolyte having a viscosity and an internal resistivity, the electrolyte comprising: (a) one or more solvents; (b) one or more ionic salts; and, (c) a multifunctional monomer comprising two or more unsaturated aliphatic reactive moieties per molecule, which multifuntional monomer is soluble in the one or more solvents, which multifunctional monomer rapidly polymerizes when the electrolyte is heated to an initiation temperature greater than 100° C., thereby increasing the viscosity and internal resistivity of the electrolyte; and, (ii) incorporating said electrolyte into an electric current producing cell by interposing said electrolyte between a cathode and an anode. In one embodiment, upon rapid polymerization of the electrolyte at the initiation temperature, the viscosity and internal resistivity of the electrolyte increase to a level sufficient to safely terminate current producing operation of the cell.

EXAMPLES

Several embodiments of the present invention are described in the following examples, which are offered by way of illustration and not by way of limitation.

Example 1

The divinyl ethers of ethylene glycol (DVEEG), diethylene glycol (DVEDEG), and triethylene glycol (DVETEG) were obtained from International Specialty Products, Wayne, N.J., and were dried over molecular sieve and vacuum distilled over sodium before use. The water content was 15 ppm or less. A nonaqueous liquid electrolyte of a 1.0 M solution of $LiN(SO_2CF_3)_2$ (lithium imide, available from 3M Corporation, St. Paul, Minn.) in the dimethyl ether of tetraethylene glycol (TEGDME, available from Ferro Grant, Zachary, La.) was prepared. To this nonaqueous electrolyte, a divinyl ether was added and mixed to provide the nonaqueous electrolyte of this invention. Four different electrolytes were prepared: one each with DVEEG, DVEDEG, and DVETEG, with a weight ratio of the divinyl ether to the TEGDME of 0.211:1, and a fourth solution with a weight ratio of DVEEG to TEGDME of 0.053:1. A nonaqueous liquid electrolyte of a 1.0 M solution of $LiN(SO_2CF_3)_2$ in TEGDME was used as a control electrolyte.

A composite cathode with a composition by weight of 50% of elemental sulfur (available from Aldrich Chemical Company, Milwaukee, Wis.), 20% of SAB-50 conductive carbon pigment (a tradename for acetylene black available from Chevron Corporation, Baytown, Tex.), 15% of $Al_2O_3$ (DISPAL 11N7-80, a trademark for alumina powder available from CONDEA Vista Company, Houston, Tex.) and 15% of polyethylene oxide (PEO) binder (molecular weight 200,000, available from Polysciences Inc., Warrington, Pa.), was prepared by suspending the dry ingredients in acetonitrile solution, followed by mixing and grinding in a ball-mill for 12 hours. The mixture was cast on both sides of 25 $\mu$m nickel foil (Teledyne-Rodney, Ivy Land, Pa.) by the doctor blade technique and allowed to dry at room temperature for 24 hours, followed by additional drying for 1 hour at 60° C. in vacuum. The resulting cathode thickness was about 35 $\mu$m per side with an active material loading of elemental sulfur of about 1.8 mg/cm$^2$. Wound AA cells were assembled with the above cathodes, a 4 mil lithium foil (Cyprus-Foote Mineral Company, Kings Mountain, N.C.) anode, and a 25 $\mu$m thick CELGARD 2500 separator (a trademark for a polyolefin separator available from Hoechst Celanese Corporation, Charlotte, N.C.). The electrode jelly roll was inserted into stainless-steel cans with a single line coining vent on the can base and sealed. The cell vent was designed to relieve the internal pressure of the cell when the internal pressure is in the range of 600 to 800 psi. Five sets of three AA cells were filled with liquid electrolyte solutions using a vacuum back fill technique: one set of three AA cells for each of the four different liquid electrolyte solutions containing a divinyl ether monomer, and one set of three AA cells for the control electrolyte solution.

Each of the four sets of AA cells with divinyl ethers present showed good thermal stability when stored, discharged, and charged at temperatures up to 60° C. Upon four repeated discharge and charge cycles at a discharge current of 450 mA and a taper charge at 275 mA until a voltage of 2.4 V was reached followed by three more hours of charge at 2.4 V, the AA cells with the divinyl ether of diethylene glycol (DVEDEG) showed poor capacity retention upon cycling. Although the specific capacity of the AA cells containing DVEDEG had a good specific capacity averaging 1099 mAh per gram of elemental sulfur present in the cathode at the first discharge, they showed a large loss in specific capacity by the end of the fourth cycle, and no further cycling or safety testing was done on these cells. The other three sets of AA cells containing divinyl ethers showed a good specific capacity at the first discharge, as shown in Table 1, and retained a good specific capacity at the end of the fourth cycle. These three sets of AA cells were then cycled for 10 more cycles at a discharge current of 275 mA and with a voltage control charge at 250 mA until a voltage of 2.4 V was reached. The specific capacities of the three sets of AA cells were still good after a total of 14 cycles, as shown in Table 1, and all, except for one cell with the divinyl ether of triethylene glycol (DVETEG), were subjected to the hot box safety test at 130° C. for 60 minutes. The hot box was a closed oven with thermocouples to monitor the temperature of the oven and of the cell at the vent over the time of the test. The one cell with DVETEG that was not used in the hot box testing was cycled for an additional 20 cycles under the same discharge and charge conditions used during the first four cycles. This cell showed a stable specific capacity from its 15th to 34th cycles.

The hot box test at 130° C. for 60 minutes showed differences among the three sets of AA cells with divinyl ethers present in the liquid electrolyte. The two cells with DVETEG caught fire and failed the safety test after 13 to 15 minutes of testing. The three cells with the divinyl ether of ethylene glycol (DVEEG) vented without fire and passed the safety test, but showed cell temperatures reaching 165° C. to 195° C. For the three cells with DVEEG at a lower weight ratio to the TEGDME solvent, no venting was observed, and the safety test was passed without the cell temperature ever exceeding the 130° C. temperature of the oven. Examination of all three sets of AA cells after completion of the hot box testing showed that, in all the cells, the liquid electrolyte had transformed to a gel. In contrast all cells with TEGDME control electrolyte failed the hot box safety test by venting with fire.

TABLE 1

Test Data for cells with Electrolytes Comprising Divinyl ethers

| Cell No. | Divinyl Ether | Weight Ratio Divinyl Ether to TEGDME | 1st Discharge mAh/g | 14th Discharge mAh/g | 130° C. Hot Box Test |
|---|---|---|---|---|---|
| 1 | DVEEG | 0.211 | 910 | 516 | Vented |
| 2 | DVEEG | 0.211 | 939 | 642 | Vented |
| 3 | DVEEG | 0.211 | 933 | 598 | Vented |
| 4 | DVEDEG | 0.211 | 1070 | No Data | Not Tested |
| 5 | DVEDEG | 0.211 | 1128 | No Data | Not Tested |
| 6 | DVEDEG | 0.211 | 1100 | No Data | Not Tested |
| 7 | DVETEG | 0.211 | 974 | 661 | Failed, Fire |
| 8 | DVETEG | 0.211 | 1002 | 699 | Failed, Fire |
| 9 | DVETEG | 0.211 | 1042 | 750 | Not Tested |
| 10 | DVEEG | 0.053 | 980 | 519 | No Vent |
| 11 | DVEEG | 0.053 | 904 | 498 | No Vent |
| 12 | DVEEG | 0.053 | 988 | 538 | No Vent |

Polymerization of divinyl ethers is known to be an exothermic process. Depending on pure and concentration of the divinyl ether, the exothermic heat of polymerization may be high and rapid enough to increase the cell temperature and contribute to the failure of the hot box safety test before the cell is safely controlled or terminated. A decrease in the amount of DVEEG from a weight ratio to the TEGDME solvent of 0.211:1 down to 0.053:1 was sufficient to stabilize the cells during the hot box safety test and to shutdown the cell without the temperature going above the 130° C. temperature of the hot box. It is important to note, that although playing such a critical role in the safety behavior of the liquid electrolyte, the concentration of the divinyl ether (DVEEG) had only a negligible effect on the electrochemical performance. This result indicates that the properties of the nonaqueous electrolytes with multifunctional unsaturated aliphatic reactive monomers, such as divinyl ether monomers, may be adjusted to provide effective combinations of electrochemical performance and safety.

The ionic conductivity of the electrolyte with DVEEG (5.3%) was 3.0 mS/cm in the liquid state. The ionic conductivity was reduced to 1.3 mS/cm in the gel form.

Example 2

A nonaqueous electrolyte of a 1.3 M solution of $LiSO_3CF_3$ (lithium triflate, available from 3M Corporation, St. Paul, Minn.) in 50% 1,2-dimethoxyethane (DME), 45% 1,3-dioxolane (1,3-DOL) and 5% ortho-xylene (O-XYL) by volume was prepared as the control electrolyte. Two electrolytes in which either 5% by volume DME (Group 1) or 5% by volume 1,3-DOL (Group 2) was replaced by the divinyl ether of triethylene glycol (DVETEG) were prepared by standard methods. The electrolyte composition of each group and control is summarized in Table 2.

TABLE 2

Electrolyte Compositions

| Cell Group | DME Vol % | 1,3-DOL Vol % | O-XYL Vol % | DVETEG Vol % |
|---|---|---|---|---|
| Control | 50 | 45 | 5 | 0 |
| Group 1 | 45 | 45 | 5 | 5 |
| Group 2 | 50 | 40 | 5 | 5 |

A composite cathode with the composition (dry weight basis) of 60% elemental sulfur, 10% conductive carbon pigment (PRINTEX XE-2, a trademark for a carbon pigment available from Degussa Corporation, Akron, Ohio), 20% non-activated carbon nanofibers (PYROGRAF-III, a tradename for carbon nanofibers available from Applied Sciences, Inc., Cedarville, Ohio), 5% $SiO_2$ (AEROSIL 380, a trademark for silica available from Degussa Corporation, Akron, Ohio) and 5% polytetrafluoroethylene binder (TEFLON, a trademark for PTFE polymer available from DuPont Corporation, Wilmington, Del.) was prepared by a standard paste method using isopropanol as the dispersing medium, and extruded onto a 175 μm aluminum EXMET (a trademark for a metal grid current collector available from EXMET Corporation, Naugatuck, Conn.) current collector by the Rondo extrusion technique. Cathodes were dried for 1 hour at 60° C. in vacuum. The resulting dry cathode had a total thickness in the range of 200 μm with an active cathode material loading density of 3.0 mg/cm$^2$. Wound AA cells were assembled with the composite sulfur cathode, a 25 μm E25 SETELA separator (a trademark for a polyolefin separator available from Tonen Chemical Corporation, Tokyo, Japan, and also available from Mobil Chemical Company, Films Division, Pittsford, N.Y.), and 100 μm Li foil anode. The electrode jelly roll was inserted into a stainless steel can as described in Example 1. The cells were filled with either the control liquid electrolyte or one of the electrolytes comprising 5% by volume DVETEG using a vacuum back filling technique.

Cells were cycled for 5 cycles, at a rate of charge and discharge of 100 and 165 mA respectively. The specific discharge capacity of a cell representing each electrolyte formulation and the control is shown in FIG. 1. No significant difference in the cycling behavior and specific capacity was observed between cells with control electrolyte and those with electrolyte comprising DVETEG. At the end of the 5$^{th}$ cycle, cells were charged and a 130° C., 60 minute hot box safety test was performed. The results of the safety tests are summarized in Table 3.

TABLE 3

130° C., 60 Minute, Hot Box Safety Test Results

| Cell Group | Number of Cells | |
|---|---|---|
| | Pass | Fail |
| Control | 0 | 2 |
| Group 1 | 2 | 0 |
| Group 2 | 2 | 0 |

Figure 2:
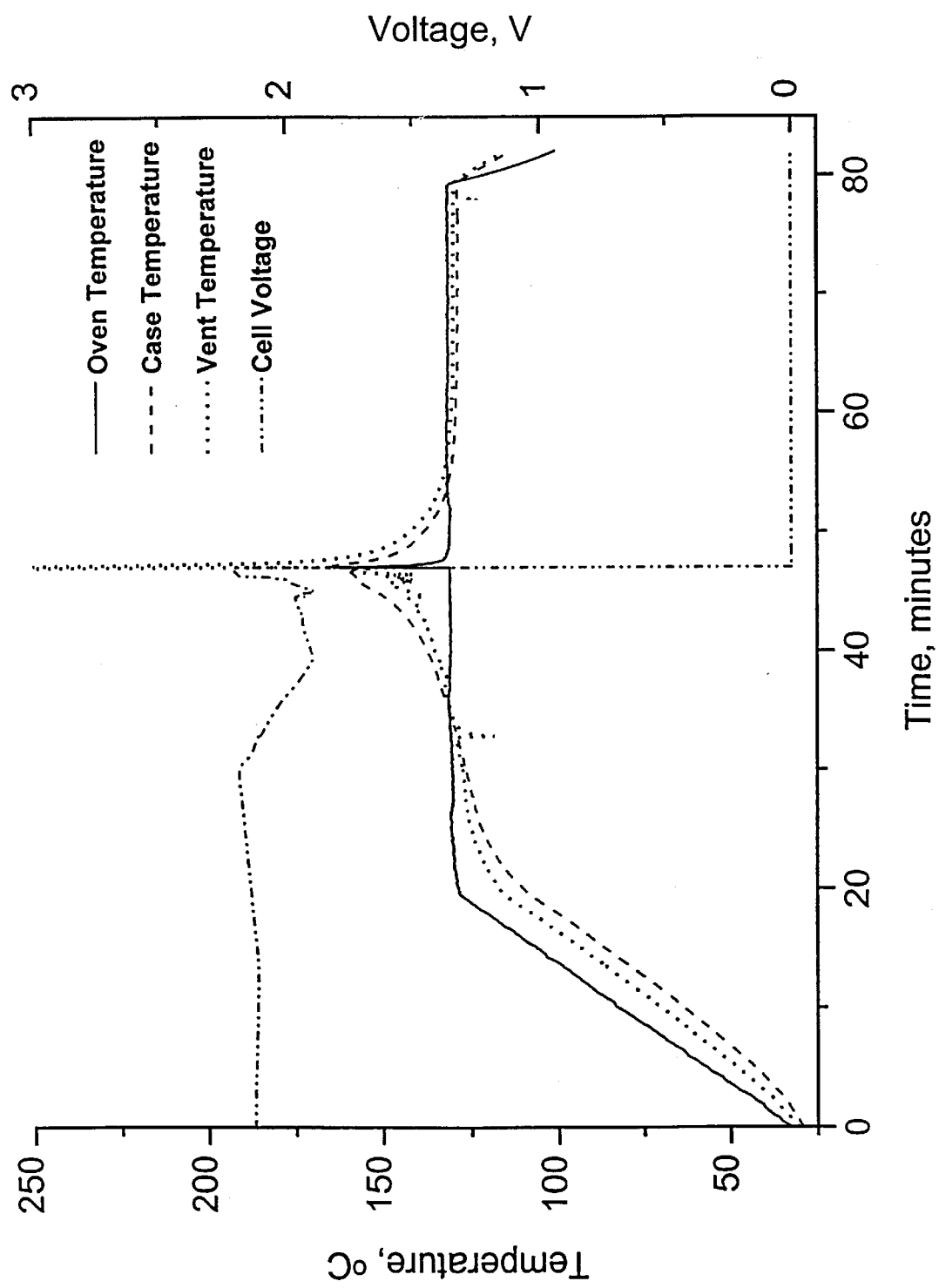
FIG. 2 shows the 130° C. hot box safety test data for a control cell, as described in Example 2.
Figure 3:
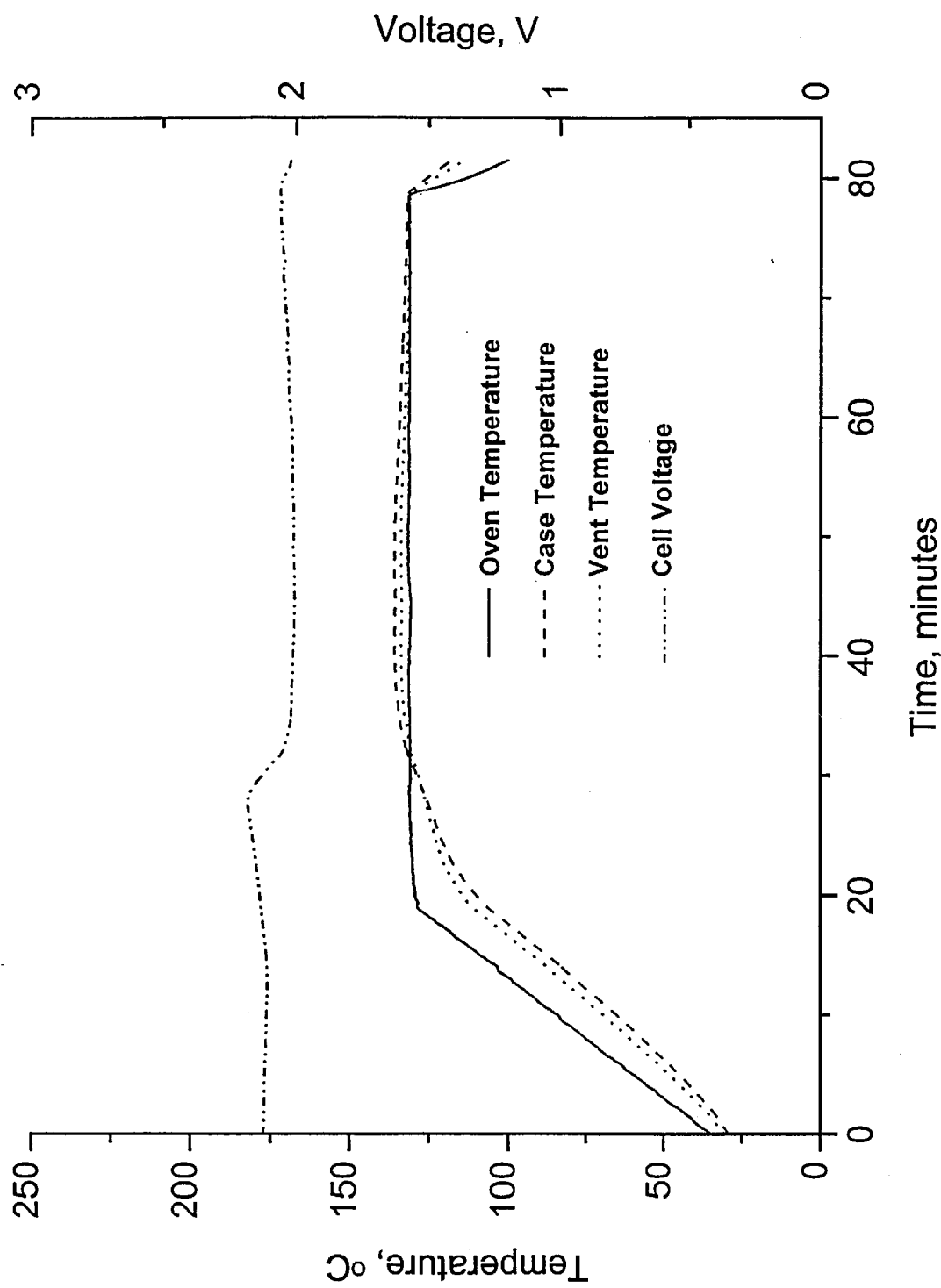
FIG. 3 shows the 130° C. hot box safety test data for a cell with an electrolyte containing DVETEG, as described in Example 2.

Cells with the control electrolyte failed the safety test by venting with fire. Test data showing the dependence of oven, case temperature and cell voltage versus time for one cell in the control group is shown in FIG. 2. The spikes at approximately 47 minutes show the cell venting. The cells in Group 1 and 2 with electrolytes comprising 5% by volume DVETEG passed the safety test without venting. Test data showing the dependence of oven, case temperature and cell voltage versus time for one cell with Group 1 electrolyte is shown in FIG. 3.

Gelation of the electrolyte was observed to have occurred when the cells were opened. At 130° C., polymerization of the electrolyte to form a gel should occur in about 10 minutes or less to be relevant to the hot box test. At 100° C., initiation of the polymerization of the electrolyte with divinyl ethers present typically takes about 15 to 20 minutes. In the presence of an effective initiator, the rate of the gelation process is increased, for example, typically occurring in 5 to 30 seconds at 130° C.

The conductivity of these liquid electrolytes with divinyl ethers present was observed to be in the range of 8–12 mS/cm before polymerization and in the range of 1–3 mS/cm after polymerization or gelation.

Example 3

A nonaqueous control electrolyte solution of 1.3 M lithium imide in 95% DME and 5% O-XYL by volume was prepared. Two nonaqueous electrolyte solutions in which either 5% (Group 3) or 11% (Group 4) by volume DME was replaced by DVETEG were also prepared.

Wound AA cells with composite paste cathodes with a composition by weight of 60% elemental sulfur, 20% non-activated carbon nanofibers (PYROGRAF-III), 10% PRINTEX XE-2 carbon pigment, 5% SiO$_2$ (a silica available under the trademark of EH-5 CARBOSIL from Cabot Corporation, Billerica, Mass.) and 5% TEFLON binder, a thickness of 250 μm and an active cathode material loading density of 3.3 mg/cm$^2$ were prepared as described in Example 2. Four cells for each group and the control were filled with electrolyte by vacuum back filling.

Cells were cycled at rate of discharge of 165 mA and rate of charge of 75 mA for 10 cycles before being subjected to the 130° C. hot box safety test. The test results are summarized in Table 4.

TABLE 4

Electrolyte Compositions

| Cell Group | DME Vol % | O-xylene Vol % | DVETEG Vol % | 10$^{th}$ Cycle Total Capacity mAh | 130° C. Hot Box Safety Test: No. of Cells | |
|---|---|---|---|---|---|---|
| | | | | | Pass | Fail |
| Control | 95 | 5 | 0 | 753, 728, 670, 673 | 1 | 3 |
| Group 3 | 90 | 5 | 5 | 654, 630, 608, 609 | 3 | 1 |
| Group 4 | 84 | 5 | 11 | 529, 639, 623, 550 | 1 | 3 |

The control cells showed a 75% fail rate while those with an electrolyte with 5% DVETEG had a 75% pass rate, showing improved safety of those cells with an electrolyte comprising a divinyl ether. The four cells with an electrolyte with 11% DVETEG had a 75% fail rate as observed for the control cells. This high failure rate of cells in which the electrolyte contains a large ratio of DVETEG may be accounted for by the exothermic effect of polymerization of the divinyl ether.

Example 4

Nonaqueous liquid electrolytes of 1.15 M solutions of lithium imide with DVETEG and without DVETEG as a control were prepared as shown in Table 5. Wound AA cells, with the cathode formulation of Example 3 (active material loading 3.2 mg/cm$^2$), were assembled and filled with electrolyte as described in Example 3. The cells were cycled at rate of discharge of 165 mA and rate of charge of 75 mA for 10 cycles before being subjected to the 130° C. hot box safety test for 60 minutes.

TABLE 5

Electrolyte Compositions

| Cell Group | DME Vol % | TEGDME Vol % | O-XYL Vol % | Sulfolane Vol % | 1,3-DOL Vol % | DVETEG Vol % | 10$^{th}$ Cycle Total Capacity mAh |
|---|---|---|---|---|---|---|---|
| Control | 20 | 20 | 5 | 5 | 50 | 0 | 760, 780 |
| Group 5 | 20 | 20 | 5 | 5 | 45 | 5 | 610, 620 |
| Group 6 | 20 | 15 | 5 | 5 | 50 | 5 | 610, 550 |
| Group 7 | 20 | 20 | 5 | 0 | 50 | 5 | 570 |

The cells which contained divinyl ether in the electrolyte passed the 130° C., 60 minute, hot box safety test, whereas all the control cells failed, as shown in Table 6.

TABLE 6

130° C., 60 Minute, Hot Box Safety Test Results

| Cell Group | Number of Cells | |
|---|---|---|
| | Pass | Fail |
| Control | 0 | 2 |
| Group 5 | 2 | 0 |
| Group 6 | 2 | 0 |
| Group 7 | 1 | 0 |

Example 5

Non aqueous liquid electrolytes of 1.3 M solutions of lithium imide with and without a mixture of three multifunctional monomers, DVETEG/divinyl ether of 1,4-cyclohexanedimethanol/diallyl ether in a ratio of 3:1:1 by volume, were prepared as shown in Table 7.

TABLE 7

Electrolyte Compositions

| Cell Group | DME Vol % | 1,3-DOL Vol % | O-XYL Vol % | Combined Monomer Additives Vol % | $5^{th}$ Cycle Total Capacity mAh |
|---|---|---|---|---|---|
| Control | 45 | 50 | 5 | 0 | 703, 711 |
| Group 3 | 45 | 45 | 5 | 5 | 724, 670 |
| Group 9 | 40 | 50 | 5 | 5 | 670, 684 |
| Group 10 | 40 | 45 | 5 | 10 | not tested |

Wound AA cells were assembled as described in Example 2 with a composite paste cathode composition by weight of 65% carbon-sulfur polymer (made by the process described in Example 2 in U.S. patent application Ser. No. 08/995,122, titled "Electroactive, Energy-Storing, Highly Crosslinked, Polysulfide-Containing Organic Polymers for Use in Electrochemical Cells," to the common assignee by Gorkovenko et al.), 10% conductive carbon pigment (PRINTEX XE-2), 20% PYROGRAF-III carbon nanofibers; 5% PEO (molecular weight 200,000, available from Polysciences Inc., Warrington, Pa.), and 5% TEFLON polymer, prepared by the method described in Example 2. The loading of carbon-sulfur polymer was 3.6 mg/cm$^2$.

The cells were filled with electrolyte as described in Example 3. Cells were cycled at a rate of discharge and charge of 100 mA for the first cycle, to 1.25 and 3.0 V cutoffs (150% overcharge), and then under a GSM pulse discharge of equivalent to 165 mA DC average to a 150% overcharge for all subsequent cycles (1.25 and 3.0 V cutoffs). After the $5^{th}$ cycle, cells were subjected to the 130° C. hot box safety test for 60 minutes. The results are shown in Table 8.

TABLE 8

130° C., 60 Minute, Hot Box Safety Test Results

| Cell Group | Number of Cells | |
|---|---|---|
| | Pass | Fail |
| Control | 1 | 1 |
| Group 8 | 2 | 0 |
| Group 9 | 2 | 0 |
| Group 10 | 1 | 0 |

Cells with the mixture of three different multifunctional monomers showed safe behavior, whereas the control cells demonstrated a less safe behavior.

Example 6

A nonaqueous liquid electrolyte of a 0.75 M solution of lithium imide in 50% 1,3-DOL, 45% DME and 5% divinyl ether of triethylene glycol (DVETEG) by volume was prepared. A nonaqueous liquid electrolyte of a 0.75 M solution of lithium imide in 50% 1,3-DOL, and 50% DME was used as the control.

Prismatic form factor cells were assembled with a composite cathode with a composition (dry weight basis) of 75% elemental sulfur, 20% conductive carbon pigment (PRINTEX XE-2) and 5% non-activated carbon nanofibers (PYROGRAF-III), prepared by the method described in Example 1 using isopropanol as the solvent, cast on both sides of a 18 μm conductive carbon coated aluminum foil (product No. 60303, available from Rexam Graphics, South Hadley, Mass.) as a current collector, a 2 mil lithium foil anode, and either a E25 SETELA or CELGARD separator. The cells were filled with either the liquid electrolyte containing DVETEG or with the control electrolyte by a vacuum back fill technique. Cells were cycled for between 4 and 19 cycles at rates of charge of 100, 150, 200 or 300 mA and rates of discharge of 150, 200, 250, 350 or 500 mA. The capacity of both the test and control cells was in the range 250 to 1200 mAh on the last cycle before safety testing. After the last charge cycle the cells were subjected to the 130° C. hot box safety test for 60 minutes.

While comparative cells with the control electrolyte showed a 75% fail rate by venting with fire, cells with a liquid electrolyte containing 5% of the divinyl ether of triethylene glycol exhibited a 88% pass rate, showing the superior safety behavior of nonaqueous electrolytes comprising a multifunctional monomer.

Example 7

Two cells as described in Example 6 were cycled for 25 cycles. The cells were then, in the charged state, left at a temperature of 55° C. for six days. After this rest period, the cycling of the cells was resumed. The specific capacity of the cells returned to their pre-rest value after 5 cycles. Control cells behaved in exactly the same way. The results illustrate that there was no adverse effect on cell performance for cells with or without a nonaqueous electrolyte comprising a multifunctional monomer when stored at 55° C. for six days.

While the invention has been described in detail and with reference to specific embodiments thereof, it will be apparent to one skilled in the art that various changes and modifications can be made without departing from the spirit and scope thereof.

What is claimed is:

1. An electric current producing cell comprising:
   (i) a cathode;
   (ii) an anode; and
   (iii) a nonaqueous liquid electrolyte interposed between said cathode and said anode, said electrolyte comprising:
      (a) one or more solvents;
      (b) one or more ionic salts; and
      (c) a multifunctional monomer comprising two or more unsaturated aliphatic reactive moieties per molecule, which multifunctional monomer is soluble in said one or more solvents, wherein said multifunctional monomer is a multifunctional vinyl ether selected from the group consisting of divinyl ether monomers, trivinyl ether monomers, and tetravinyl ether monomers.

2. The cell of claim 1, wherein upon rapidly polymerization of said electrolyte at said initiation temperature, said viscosity and internal resistivity of said electrolyte increase to a level sufficient to safely terminate current producing operation of said cell.

3. The cell of claim 1, wherein said multifuictional monomer is a divinyl ether monomer.

4. The cell of claim 1, wherein said multifunctional monomer is a divinyl ether selected from the group consisting of divinyl ether of ethylene glycol, divinyl ether of diethylene glycol, divinyl ether of triethylene glycol, divinyl ether of tetraethylene glycol, divinyl ether of 1,4-butanediol, and divinyl ether of 1,4-cyclohexanedimethanol.

5. The cell of claim 1, wherein said one or more solvents comprises a solvent selected from the group consisting of N-methyl acetamide, acetonitrile, organic carbonates, sulfolanes, sulfones, N-alkyl pyrrolidones, dioxolanes, glymes, siloxanes, and xylenes.

6. The cell of claim 1, wherein said one or more ionic salts comprise a lithium salt.

7. The cell of claim 1, wherein the weight ratio of the combined total weight of the multifunctional monomers present to the combined total weight of said one or more solvents is in the range of 0.01:1 to 0.25:1.

8. The cell of claim 1, wherein the weight ratio of the combined total weight of the multifunctional monomers present to the combined total weight of said one or more solvents is in the range of 0.02:1 to 0.1:1.

9. The cell of claim 1, wherein said electrolyte farther comprises a monofunctional monomer having one unsaturated aliphatic reactive moiety per molecule, which monofunctional monomer is soluble in said one or more solvents, which monofunctional monomer rapidly reacts with said multifunctional monomer when said electrolyte is heated to said initiation temperature.

10. The cell of claim 9, wherein said monofunctional monomer is a monofunctional monomer selected from the group consisting of vinyl ethers and allyl ethers.

11. The cell of claim 9, wherein said monofunctional monomer is a monofunctional vinyl ether selected from the group consisting of vinyl ether of 1-butanol, vinyl ether of 2-ethyl hexanol, and vinyl ether of cyclohexanol.

12. The cell of claim 9, wherein the weight ratio of the combined total weight of the monofunctional monomers present to the combined total weight of said one or more solvents and the multifunctional monomers present is in the range of 0.005:1 to 0.2:1.

13. The cell of claim 9, wherein the weight ratio of the combined total weight of the monofunctional monomers present to the combined total weight of said one or more solvents and the multifunctional monomers present is in the range of 0.01:1 to 0.1:1.

14. The cell of claim 1, wherein said cathode comprises an electroactive sulfur-containing material which comprises elemental sulfur.

15. The cell of claim 1, wherein said cathode comprises an electroactive sulfur-containing material which, in its oxidized state, comprises a polysulfide moiety of the formula, —$S_m$—, wherein m is an integer equal to or greater than 3.

16. The cell of claim 1, wherein said cathode comprises an electroactive sulfur-containing material which, in its oxidized state, comprises a disulfide group.

17. The cell of claim 1, wherein said cathode comprises an electroactive transition metal chalcogenide.

18. The cell of claim 1, wherein said cathode comprises an electroactive conductive polymer.

19. The cell of claim 1, wherein said anode comprises one or more anode active materials selected from the group consisting of lithium metal, lithium-aluminum alloys, lithium-tin alloys, lithium-intercalated carbons, and lithium-intercalated graphites.

20. The cell of claim 1, wherein said multifunctional monomer does not significantly polymerize at a temperature of 60° C. over a period of 36 hours.

21. The cell of claim 1, wherein said multifunctional monomer does not significantly polymerize at a temperature of 80° C. over a period of 36 hours.

22. The cell of claim 1, wherein said multifunctional monomer does not rapidly polymerize at temperatures less than 100° C.

23. The cell of claim 1, wherein said electrolyte further comprises a solid porous separator.

24. The cell of claim 23, wherein said separator is a porous polyolefin separator.

25. The cell of claim 23, wherein said separator comprises a microporous pseudo-boehmite layer.

26. The cell of claim 24, wherein said electrolyte comprises a solid porous separator and said separator does not melt at a temperature which is greater than 100° C. and which is the lowest temperature at which polymerization of said multifunctional monomer rapidly occurs to increase said viscosity and internal resistivity of said electrolyte.

27. A nonaqueous liquid electrolyte for use in an electric current producing cell, said electrolyte comprising:
  (i) one or more solvents;
  (ii) one or more ionic salts; and
  (iii) a multifunctional monomer comprising two or more unsaturated aliphatic reactive moieties per molecule, which multifuntional monomer is soluble in said one or more solvents, wherein said multifunctional monomer is a multifunctional vinyl ether monomer selected from the group consisting of divinyl ether monomers, trivinyl ether monomers, and tetravinyl ether monomers.

28. The electrolyte of claim 27, wherein said multifunctional monomer is a divinyl ether monomer.

29. The electrolyte of claim 27, wherein said multifunctional monomer is a divinyl ether selected from the group consisting of divinyl ether of ethylene glycol, divinyl ether of diethylene glycol, divinyl ether of triethylene glycol, divinyl ether of tetraethylene glycol, divinyl ether of 1,4-butanediol, and divinyl ether of 1,4-cyclohexanedimethanol.

30. The electrolyte of claim 27, wherein said one or more solvents comprise a solvent selected from the group consisting of N-methyl acetamide, acetonitrile, organic carbonates, sulfolanes, sulfones, N-alkyl pyrrolidones, dioxolanes, glymes, siloxanes, and xylenes.

31. The electrolyte of claim 27, wherein said one or more ionic salts comprise a lithium salt.

32. The electrolyte of claim 31, wherein said lithium salt is selected from the group consisting of $LiClO_4$, $LiAsF_6$, $LiSO_3CF_3$, $LiSO_3CH_3$, LiBr, LiI, LiSCN, $LiBF_4$, $LiB(phenyl)_4$, $LiPF_6$, $LiC(SO_2CF_3)_3$, $LiN(SO_2CF_3)_2$,

-continued

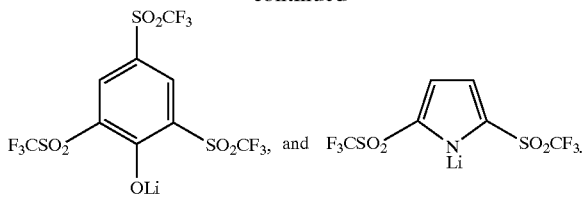

33. The electrolyte of claim 27, wherein the weight ratio of the combined total weight of the multifunctional monomers present to the combined total weight of said one or more solvents is in the range of 0.01:1 to 0.25:1.

34. The electrolyte of claim 27, wherein the weight ratio of the combined total weight of the multifunctional monomers present to the combined total weight of said one or more solvents is in the range of 0.02:1 to 0.1:1.

35. The electrolyte of claim 27, wherein said electrolyte further comprises a monofunctional monomer having one unsaturated aliphatic reactive moiety per molecule, which monofunctional monomer is soluble in said one or more solvents.

36. The electrolyte of claim 35, wherein said monofunctional monomer is a monomer selected from the group consisting of vinyl ethers and allyl ethers.

37. The electrolyte of claim 35, wherein said monofunctional monomer is a vinyl ether selected from the group consisting of vinyl ether of 1-butanol, vinyl ether of 2-ethylhexanol, and vinyl ether of cyclohexanol.

38. The electrolyte of claim 27, wherein said electrolyte further comprises a solid porous separator.

39. The electrolyte of claim 38, wherein said separator is a porous polyolefin separator.

40. The electrolyte of claim 38, wherein said separator comprises a microporous pseudo-boehmite layer.

41. A method of forming an electric current producing cell, said method comprising the steps of:
(i) providing a cathode;
(ii) providing an anode; and
(iii) interposing a nonaqueous liquid electrolyte between said anode and said cathode, said electrolyte having a viscosity and an internal resistivity, said electrolyte comprising:
(a) one or more solvents;
(b) one or more ionic salts; and
(c) a multifunctional monomer comprising two or more unsaturated aliphatic reactive moieties per molecule, which multifuntional monomer is soluble in said one or more solvents, wherein said multifunctional monomer is a multifunctional vinyl ether.

42. The method of claim 41, wherein, upon rapid polymerization of said multifunctional vinyl ether at an initiation temperature greater than 100° C., said viscosity and internal resistivity of said electrolyte increase to a level sufficient to safely terminate current producing operation of said cell.

43. A method for preparing a nonaqueous liquid electrolyte for use in an electric current producing cell, said method comprising the steps of:
(a) preparing a solution of one or more solvents; one or more ionic salts; and a multifunctional monomer comprising two or more unsaturated aliphatic reactive moieties per molecule, which multifuntional monomer is soluble in said one or more solvents, wherein said multifunctional monomer is a multifunctional vinyl ether monomer; and
(b) optionally combining said solution with other materials selected from the group consisting of solid porous separators, ionically conductive polymers, and monofunctional monomers having one unsaturated aliphatic reactive moiety per molecule.

44. A method for increasing the safety of an electric current producing cell comprising the steps of:
(i) providing a nonaqueous liquid electrolyte, said electrolyte having a viscosity and an internal resistivity, said electrolyte comprising:
(a) one or more solvents;
(b) one or more ionic salts; and
(c) a multifunctional monomer comprising two or more unsaturated aliphatic reactive moieties per molecule, which multifuntional monomer is soluble in said one or more solvents, wherein said multifunctional monomer is a multifunctional vinyl ether monomer; and
(ii) incorporating said electrolyte into an electric current producing cell by interposing said electrolyte between a cathode and an anode.

45. The method of claim 44, wherein, upon rapid polymerization of said multifunctional vinyl ether monomer at an initiation temperature greater than 100° C., said viscosity and internal resistivity of said electrolyte increase to a level sufficient to safely terminate current producing operation of said cell.

46. The cell of claim 1, wherein said electrolyte has a viscosity and an internal resistivity, and said multifunctional monomer rapidly polymerizes when said electrolyte is heated to an initiation temperature greater than 100° C., thereby increasing said viscosity and internal resistivity of said electrolyte.

47. The cell of claim 1, wherein said cell is utilized in a secondary battery.

48. The cell of claim 1, wherein said cell is utilized in a primary battery.

49. The electrolyte of claim 27, wherein said electrolyte has a viscosity and an internal resistivity, and said multifunctional monomer rapidly polymerizes when said electrolyte is heated to an initiation temperature greater than 100° C., thereby increasing said viscosity and internal resistivity of said electrolyte.

50. The method of claim 41, wherein said method comprises a step (iv) of utilizing said cell in a secondary battery.

51. The method of claim 41, wherein said method comprises a step (iv) of utilizing said cell in a primary battery.

52. The method of claim 44, wherein said method comprises a step (iii) of utilizing said cell in a secondary battery.

53. The method of claim 44, wherein said method comprises a step (iii) of utilizing said cell in a primary battery.

* * * * *